(12) United States Patent
Araki et al.

(10) Patent No.: US 10,846,916 B2
(45) Date of Patent: Nov. 24, 2020

(54) IMAGE PROCESSING APPARATUS AND IMAGE PROCESSING METHOD

(71) Applicant: SONY CORPORATION, Tokyo (JP)

(72) Inventors: Yuichi Araki, Tokyo (JP); Nobuaki Izumi, Kanagawa (JP); Junichiro Enoki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/769,575

(22) PCT Filed: Nov. 21, 2016

(86) PCT No.: PCT/JP2016/084381
§ 371 (c)(1),
(2) Date: Apr. 19, 2018

(87) PCT Pub. No.: WO2017/094536
PCT Pub. Date: Jun. 8, 2017

(65) Prior Publication Data
US 2018/0315239 A1   Nov. 1, 2018

(30) Foreign Application Priority Data
Dec. 1, 2015   (JP) .................................. 2015-234468

(51) Int. Cl.
*G06T 15/50*   (2011.01)
*G06T 1/00*    (2006.01)
*G06T 15/20*   (2011.01)

(52) U.S. Cl.
CPC ............... *G06T 15/50* (2013.01); *G06T 1/00* (2013.01); *G06T 15/205* (2013.01); *G06T 2200/04* (2013.01); *G06T 2210/44* (2013.01)

(58) Field of Classification Search
CPC ......... G06T 19/00; G06T 17/20; G06T 17/00; G06T 15/10; G06T 15/00; G06T 15/40;
(Continued)

(56) References Cited

U.S. PATENT DOCUMENTS 6,397,120 B1 * 5/2002 Goldman .............. D05B 19/08
                                                       112/102.5
2004/0056858 A1   3/2004 Ohba et al.
(Continued)

FOREIGN PATENT DOCUMENTS

JP   2006-285415 A   10/2006
JP   2012-170067 A    9/2012
(Continued)

OTHER PUBLICATIONS

Aug. 30, 2018, European Search Report issued for related EP application No. 16870473.2.

*Primary Examiner* — Todd Buttram
(74) *Attorney, Agent, or Firm* — Paratus Law Group, PLLC

(57) ABSTRACT

There is provided an image processing apparatus and an image processing method that can follow a fast movement of a virtual point to change a high-precision image. A position correction unit corrects a three-dimensional position of a point of a boundary of an occlusion area among a plurality of points, the three-dimensional position being included in three-dimensional data including three-dimensional positions and color information of the plurality of points, the three-dimensional data being generated from color image data and depth image data from a predetermined viewpoint. The present disclosure can be applied to, for example, an image processing apparatus or the like that generates color image data from a virtual viewpoint on the basis of color image data and depth image data from a predetermined viewpoint.

10 Claims, 29 Drawing Sheets

(58) Field of Classification Search
CPC ..... G06T 15/405; G06T 15/005; G06T 15/06; G06T 15/20; G06T 15/503
See application file for complete search history.

(56) References Cited

U.S. PATENT DOCUMENTS

| | | |
|---|---|---|
| 2005/0234333 A1 | 10/2005 | Takemoto et al. |
| 2005/0265608 A1* | 12/2005 | Suino ................. G06T 5/10 382/233 |
| 2007/0070085 A1* | 3/2007 | Yamagata ............ G09G 3/20 345/606 |
| 2009/0190852 A1* | 7/2009 | Lim .................. G06T 15/205 382/256 |
| 2011/0273537 A1* | 11/2011 | Lin ................... G06T 7/55 348/43 |
| 2013/0315472 A1* | 11/2013 | Hattori .............. G06T 19/20 382/154 |

FOREIGN PATENT DOCUMENTS

| | | |
|---|---|---|
| JP | 2014-211829 A | 11/2014 |
| WO | WO 2011/096136 A1 | 8/2011 |

* cited by examiner

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2016/084381 (filed on Nov. 21, 2016) under 35 U.S.C. § 371, which claims priority to Japanese Patent Application No. 2015-234468 (filed on Dec. 1, 2015), which are all hereby incorporated by reference in their entirety.

TECHNICAL FIELD

The present disclosure relates to an image processing apparatus and an image processing method, and particularly, to an image processing apparatus and an image processing method that can follow a fast movement of a virtual viewpoint to change a high-precision image.

BACKGROUND ART

A technique of generating an image from an arbitrary virtual viewpoint based on a captured image from a predetermined viewpoint has been studied from a long time ago. A countermeasure for an occlusion area is necessary in the technique.

More specifically, an image is a projection of three-dimensional space into a two-dimensional space, and an object in the background is hidden by an object in the foreground in the image. Therefore, in a case where the virtual viewpoint is different from the viewpoint during imaging, an occlusion area is generated that is an area of an object in the background hidden by an object in the foreground is the captured image, but not hidden is the image from the virtual viewpoint. An image of the occlusion area does not exist in the captured image, and the image needs to be newly generated.

An example of a method of generating the image of the occlusion area includes a method of generating an image of the occlusion area from a predetermined virtual viewpoint by using a captured image from a viewpoint different from the predetermined viewpoint (for example, see PTL 1).

CITATION LIST

Patent Literature

[PTL 1]
  JP 2006-285415A

SUMMARY

Technical Problem

However, an image of the occlusion area needs to be generated for each virtual viewpoint in the conventional method of generating the image of the occlusion area, and the image of the occlusion area is generated after the virtual viewpoint is decided. Therefore, for example, in a case of a fast movement of the virtual viewpoint corresponding to images displayed on a head mounted display in conjunction with the movement of the head wearing the head-mounted display, the image of the occlusion area may not be generated in time, and the image from the changed virtual viewpoint may not be displayed.

The present disclosure has been made in view of the circumstances, and the present disclosure enables to follow a fast movement of a virtual viewpoint to change a high-precision image.

Solution to Problem

An aspect of the present disclosure provides as image processing apparatus including a position correction unit that corrects a three-dimensional position of a point of a boundary of an occlusion area among a plurality of points, the three-dimensional position being included in three-dimensional data including three-dimensional positions and color information of the plurality of points, the three-dimensional data being generated from color image data and depth image data from a predetermined viewpoint.

The aspect of the present disclosure provides an image processing method corresponding to the image processing apparatus according to the aspect of the present disclosure.

In the aspect of the present disclosure, the three-dimensional position of the point of the boundary of the occlusion area among the plurality of points is corrected. The three-dimensional position is included in the three-dimensional data including the three-dimensional positions and the color information of the plurality of points, and the three-dimensional data is generated from the color image data and the depth image data from the predetermined viewpoint.

Note that the image processing apparatus according to the aspect of the present disclosure can be realized by causing a computer to execute a program.

In addition, the program to be executed by the computer to realize the image processing apparatus according to the aspect of the present disclosure can be provided by transmitting the program through a transmission medium or by recording the program in a recording medium.

Advantageous Effects of Invention

According to the aspect of the present disclosure, an image can be processed. Furthermore, according to the aspect of the present disclosure, a fast movement of a virtual viewpoint can be followed to change a high-precision image.

Note that the advantageous effects described here may not be limited, and the advantageous effects may be any of the advantageous effects described in the present disclosure.

DESCRIPTION OF EMBODIMENTS

Hereinafter, modes for carrying out the present disclosure (hereinafter, referred to as embodiments) will be described. Note that the embodiments will be described in the following order.

1. First Embodiment: Image Processing Apparatus (FIGS. 1 to 30)
2. Second Embodiment: Computer (FIG. 31)

First Embodiment (Configuration Example of Embodiment of Image Processing Apparatus)

Figure 1:
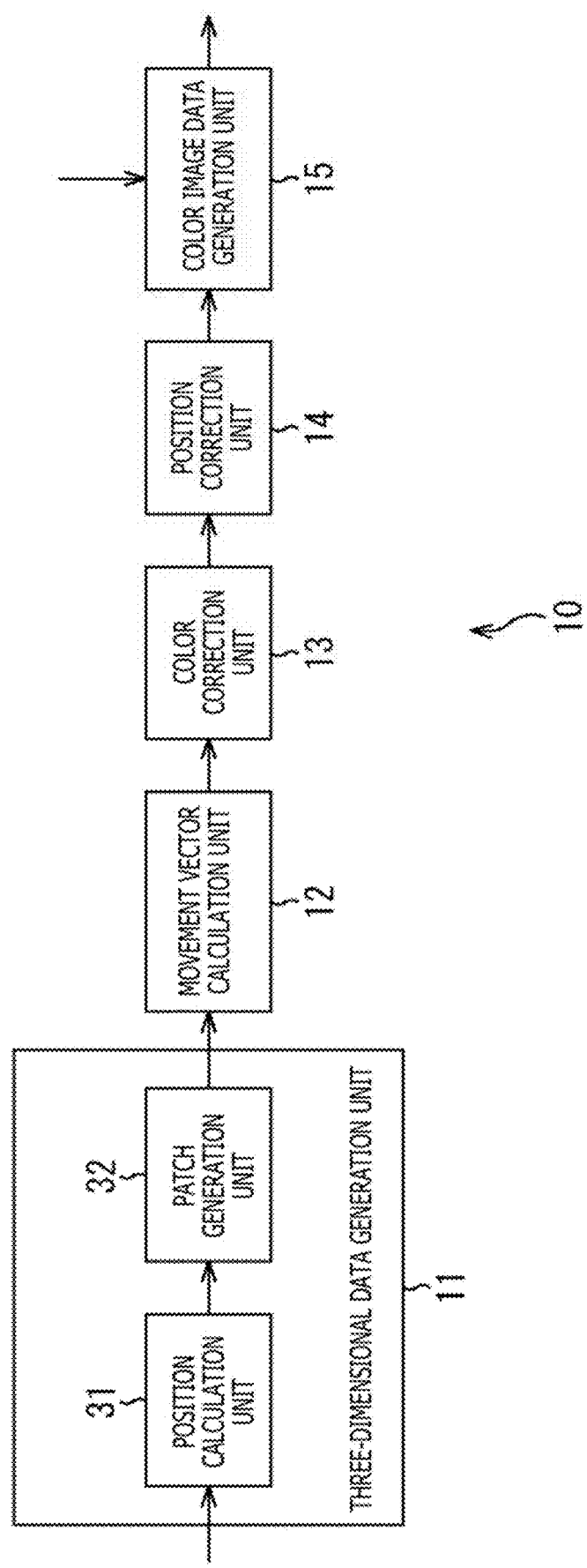
FIG. 1 is a block diagram illustrating a configuration example of an embodiment of an image processing apparatus according to the present disclosure.

FIG. 1 is a block diagram illustrating a configuration example of an embodiment of an image processing apparatus according to the present disclosure.

An image processing apparatus 10 of FIG. 1 includes a three-dimensional data generation unit 11, a movement vector calculation unit 12, a color correction unit 13, a position correction unit 14, and a color image data generation unit 15. The image processing apparatus 10 uses color image data including color information of each pixel from a predetermined viewpoint and uses depth image data including the depth indicating the position of each pixel in the depth direction of the subject to generate color image data from an arbitrary virtual viewpoint in a predetermined range different from the viewpoint.

Specifically, the three-dimensional data generation unit 11 of the image processing apparatus 10 includes a position calculation unit 31 and a patch generation unit 32. The three-dimensional data generation unit 11 generates three-dimensional data including three-dimensional positions of a plurality of points (vertices), color information, and connection information indicating the connection relationship based on the color image data and the depth image data.

In more detail, color image data and depth image data from a predetermined viewpoint are input as input image data from a camera or the like not illustrated to the position calculation unit 31. The position calculation unit 31 handles each pixel of the color image data as a point and generates a three-dimensional position of each point on the basis of the depth image data. The position calculation unit 31 associates the three-dimensional position of each point with the color information on the basis of the color image data and supplies the three-dimensional position of each point to the patch generation unit 32.

On the basis of the three-dimensional position of each point supplied from the position calculation unit 31, the patch generation unit 32 generates connection information to form one or more triangular patches, with the respective points serving as vertices. The patch generation unit 32 supplies three-dimensional data including the three-dimensional position of each point, the color information, and the connection information to the movement vector calculation unit 12.

On the basis of the three-dimensional data supplied from the patch generation unit 32, the movement vector calculation unit 12 detects a point of a boundary of an occlusion area where the position (depth) in the z-direction (depth direction) is discontinuous. The movement vector calculation unit 12 decides a movement direction of the two-dimensional position on the screen and a movement vector of the three-dimensional position regarding the point of the boundary of the occlusion area on the basis of the three-dimensional position of each point. The movement vector calculation unit 12 also sets the movement directions of the two-dimensional positions and the movement vectors of the three-dimensional positions regarding the points other than the boundary of the occlusion area to values indicating that the positions are not to be moved. The movement vector calculation unit 12 supplies the movement direction and the movement vector as well as the three-dimensional data of each point to the color correction unit 13.

The color correction unit 13 corrects the color information included in the three-dimensional data on the basis of the movement direction and the movement vector supplied from the movement vector calculation unit 12. The color correction unit 13 supplies the three-dimensional data including the corrected color information and the movement vector to the position correction unit 14.

The position correction unit 14 corrects the three-dimensional position of the point of the boundary of the occlusion area among the plurality of points included in the three-dimensional data on the basis of the movement vector supplied from the color correction unit 13. The position correction unit 14 supplies the corrected three-dimensional data to the color image data generation unit 15.

The color image data generation unit 15 generates color image data from a virtual viewpoint input through an operation or the like of a user on the basis of the three-dimensional data supplied from the position correction unit 14. Specifically, the color image data generation unit 15 projects the subject arranged in the three-dimensional space based on the three-dimensional data onto the two-dimensional plane from the virtual viewpoint to generate the color image data from the virtual viewpoint. The color image data generation unit 15 outputs the color image data from the virtual viewpoint.

In this way, the movement vector calculation unit 12 uses the same three-dimensional data regardless of the virtual viewpoint to generate the color image data from the virtual viewpoint. Therefore, the three-dimensional data can be generated in advance to change the color image data from the virtual viewpoint by following the fast movement of the virtual viewpoint.

(Example of Input Image Data)

Figure 2:
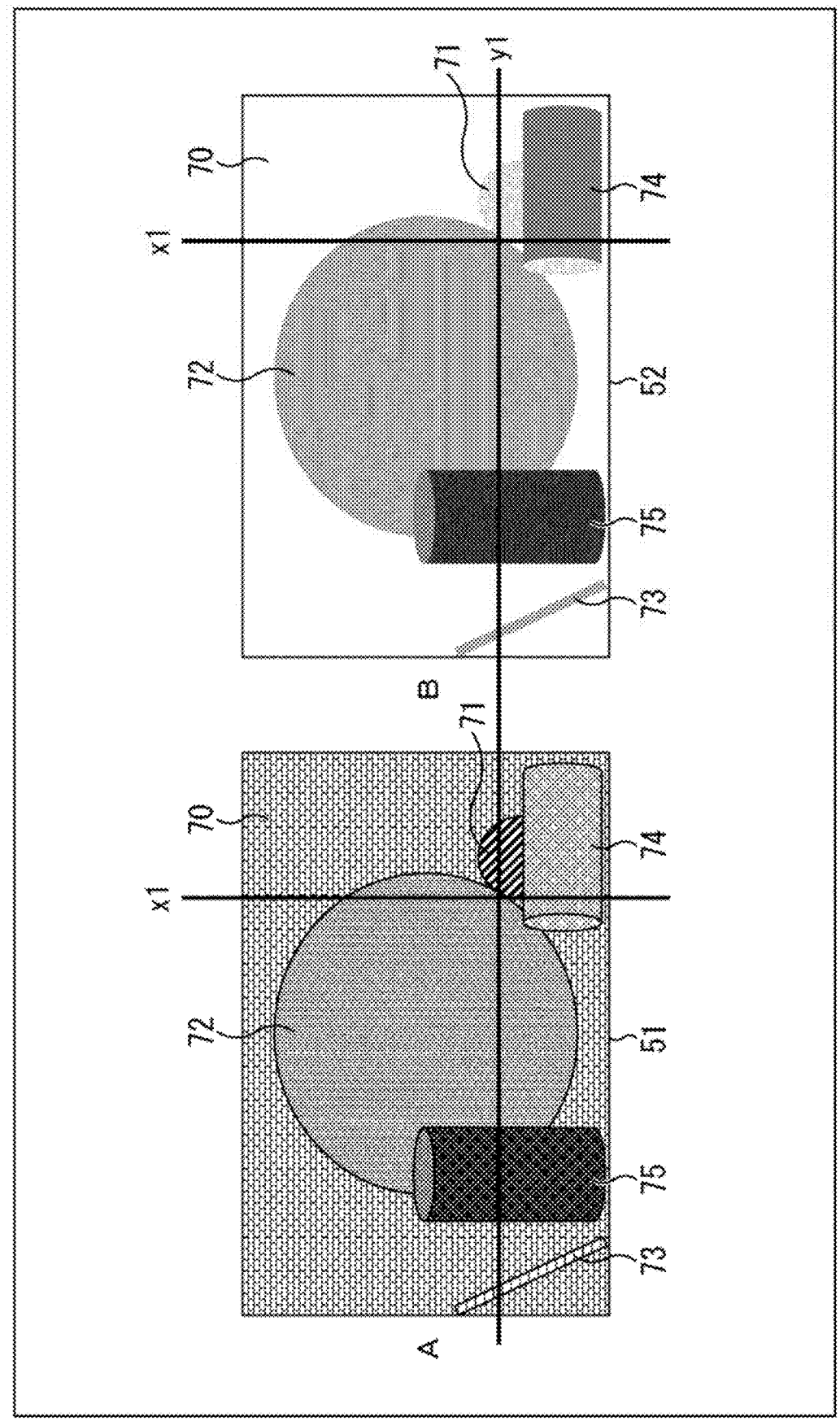
FIG. 2 depicts an example of input image data.

FIG. 2 depicts an example of the input image data.

The input image data of FIG. 2 includes color image data 51 of A in FIG. 2 and depth image data 52 of B in FIG. 2. In A of FIG. 2, the color information of the color image data is expressed by patterns. As illustrated in A of FIG. 2, the color image data includes a background 70, a partial circle 71 and a partial circle 72 that are partially missing circles, a rectangle 73, a cylinder 74, and a cylinder 75.

Furthermore, in the example of B in FIG. 2, the farther the distance, the larger the pixel value of the depth image data. In the example of B in FIG. 2, the background 70 is the whitest (brightest), and the patterns gradually become black (darker) in the order of the partial circle 71, the partial circle 72 and the rectangle 73, the cylinder 74, and the cylinder 75. This is the descending order of distance to the positions in the depth direction.

(Example of Three-Dimensional Positions)

Figure 3:
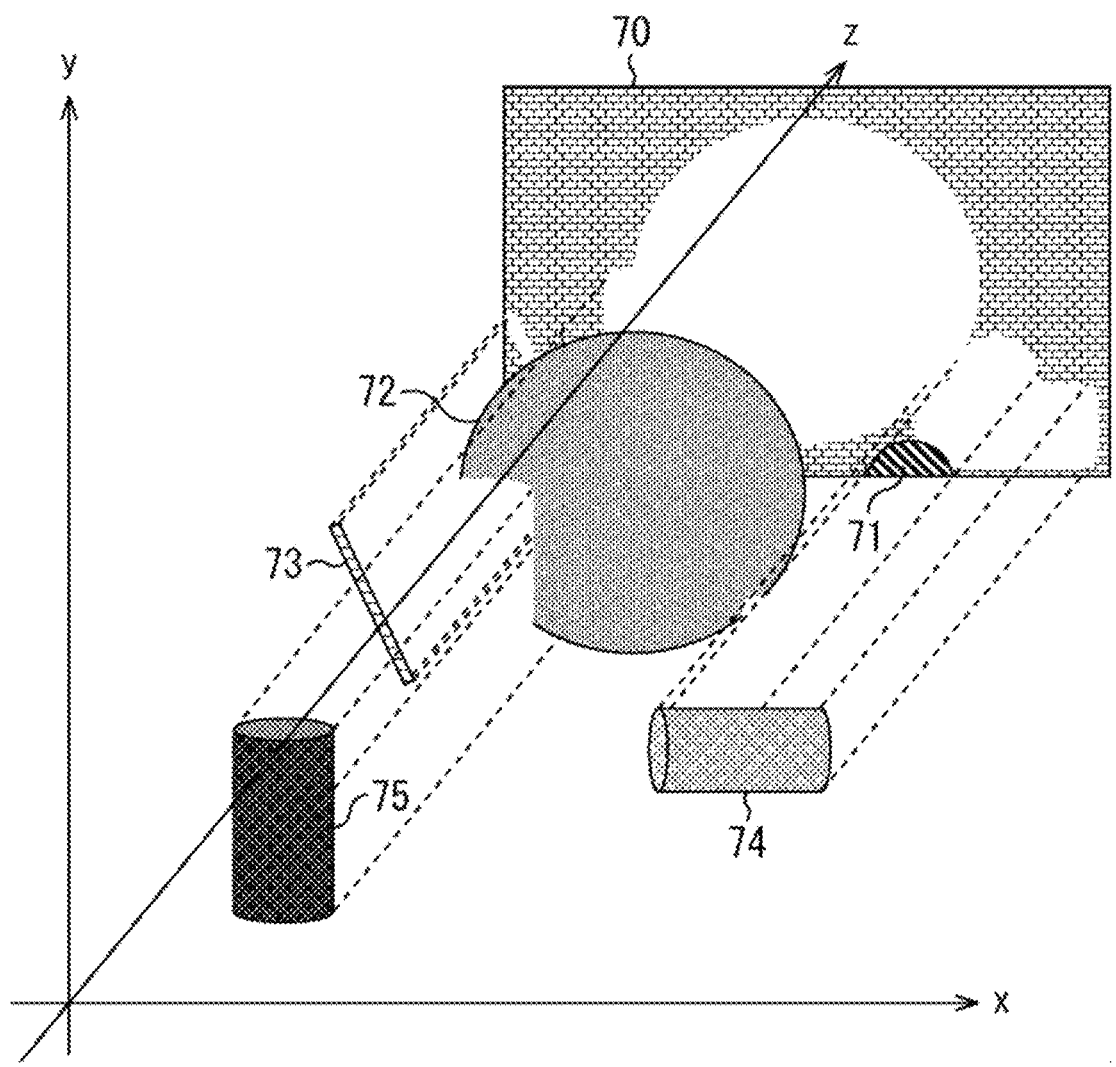
FIG. 3 depicts three-dimensional positions of a background, partial circles, a rectangle, and cylinders in FIG. 2.

FIG. 3 depicts three-dimensional positions of the background 70, the partial circle 71, the partial circle 72, the rectangle 73, the cylinder 74, and the cylinder 75 in FIG. 2.

As illustrated in FIG. 3, x-coordinates and y-coordinates of the three-dimensional positions of the background 70, the partial circle 71, the partial circle 72, the rectangle 73, the cylinder 74, and the cylinder 75 correspond to the position coordinates in the horizontal direction and the vertical direction on the screen of the color image data 51. In addition, z-coordinates of the three-dimensional positions of the background 70, the partial circle 71, the partial circle 72, the rectangle 73, the cylinder 74, and the cylinder 75 correspond to the pixel values of the depth image data 52.

An overlap area of the cylinder 75 and the partial circle 72, an overlap area of the cylinder 74 and the partial circle 72, an overlap area of the cylinder 74 and the partial circle 71, and an overlap area of the background 70, the partial circle 71, the partial circle 72, the rectangle 73, the cylinder 74, and the cylinder 75 are occlusion areas that are hidden and cannot be seen from the viewpoint of the input image data, but that are not hidden from the virtual viewpoint.

The occlusion areas are areas that cannot be seen from the viewpoint of the input image data, and the color image data of the occlusion areas does not exist in the input image data. Therefore, the image processing apparatus 10 can generate three-dimensional data based on the input image data and move the three-dimensional positions of the points of the boundaries of the occlusion areas in the three-dimensional data to generate color image data of the occlusion areas with high precision.

(Description of Process by Image Processing Apparatus)

Figure 4:
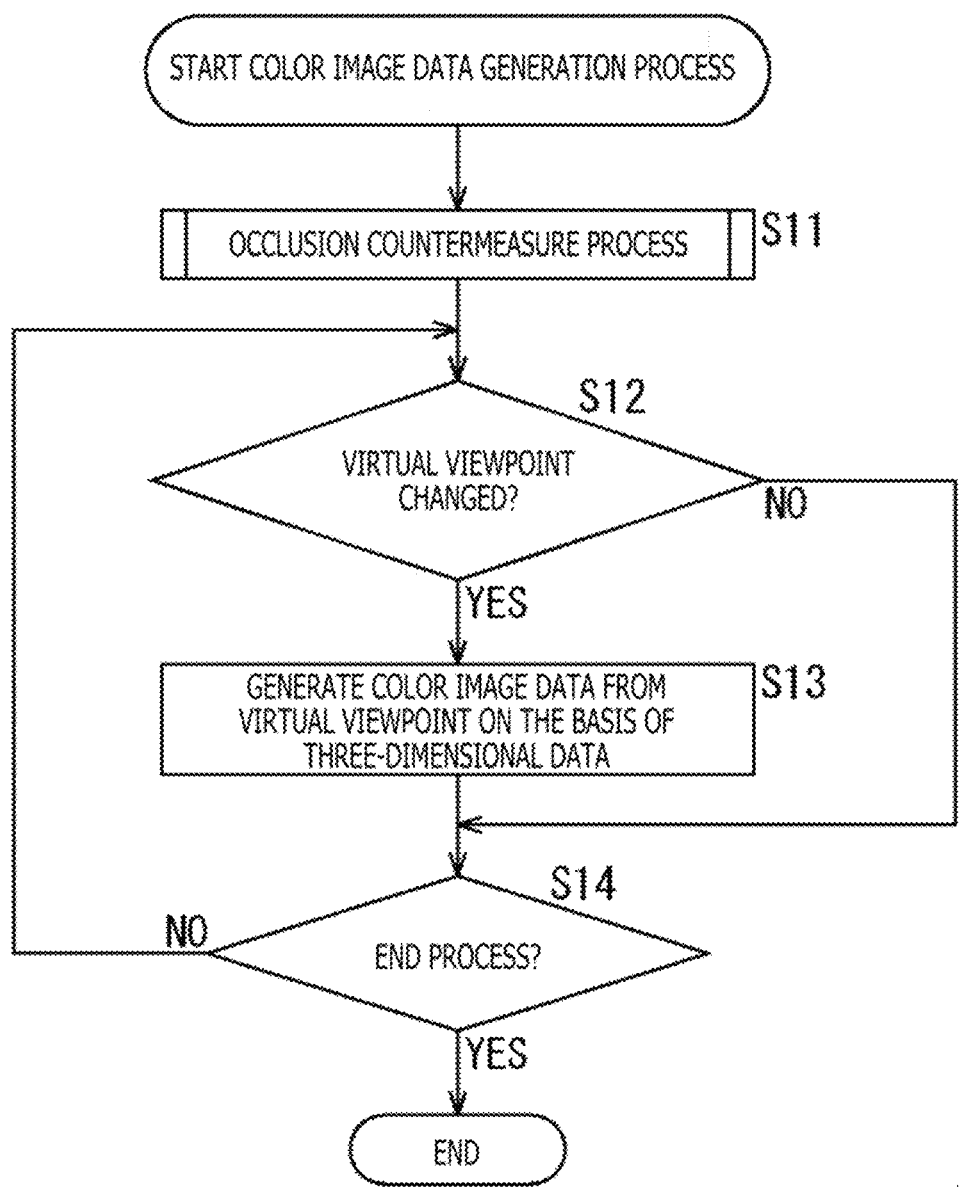
FIG. 4 is a flow chart describing a color image data generation process of the image processing apparatus in FIG. 1.

FIG. 4 is a flow chart describing a color image data generation process by the image processing apparatus 10 in FIG. 1. The color image data generation process is started when, for example, the input image data is input to the image processing apparatus 10. Note that variables in the color image data generation process are variables common in all processes, and the variables can be referenced and updated in each process.

In step S11 of FIG. 4, the image processing apparatus 10 executes an occlusion countermeasure process that enables to generate color image data of the occlusion areas with high precision. Details of the occlusion countermeasure process will be described with reference to FIG. 5 described later.

In step S12, the color image data generation unit 15 of the image processing apparatus 10 determines whether the virtual viewpoint input through an operation or the like of the user is changed. If the color image data generation unit 15 determines that the virtual viewpoint is changed in step S12, the color image data generation unit 15 generates color image data from the virtual viewpoint on the basis of the three-dimensional data supplied from the position correction unit 14 and outputs the color image data in step S13. The process then proceeds to step S14.

On the other hand, if the color image data generation unit 15 determines that the virtual viewpoint is not changed in step S12, the process proceeds to step S14.

In step S14, the image processing apparatus 10 determines whether to end the color image data generation process. If the image processing apparatus 10 determines not to end the color image data generation process in step S14, the process returns to step S12, and the process in steps S12 to S14 is repeated until the color image data generation process is finished.

On the other hand, if the image processing apparatus 10 determines to end the color image data generation process in step S14, the process ends.

Figure 5:
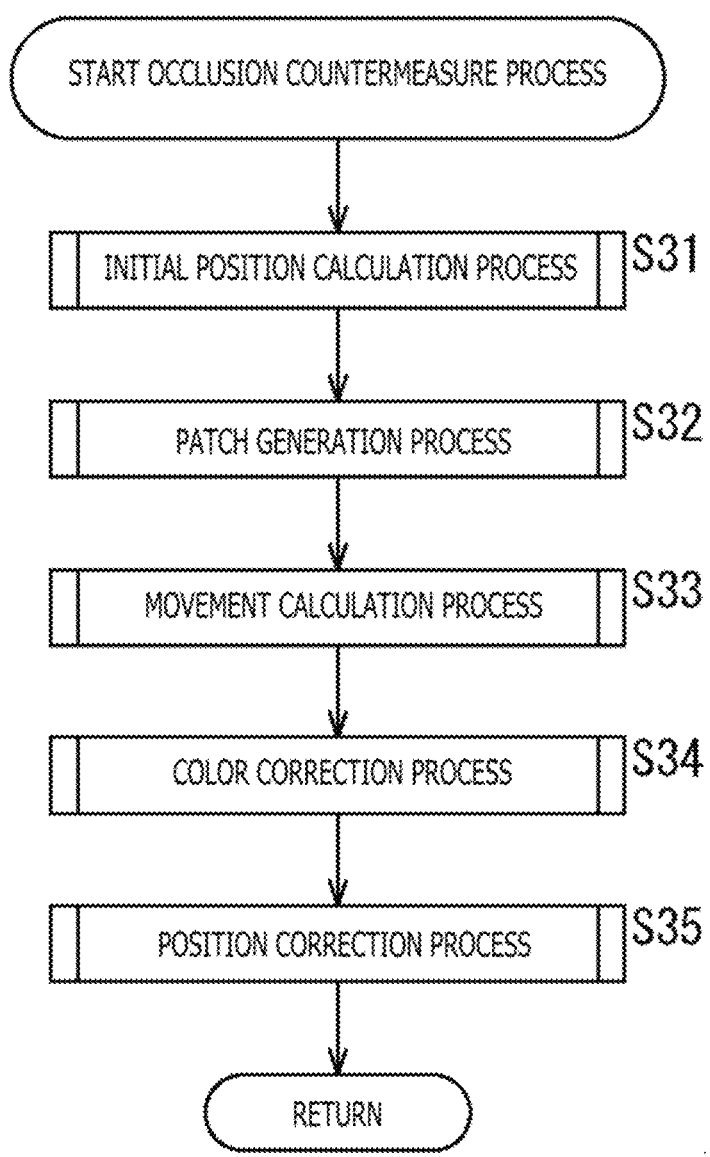
FIG. 5 is a flow chart describing details of an occlusion countermeasure process in FIG. 4.

FIG. 5 is a flow chart describing details of the occlusion countermeasure process in step S11 of FIG. 4.

In step S31 of FIG. 5, the position calculation unit 31 of the three-dimensional data generation unit 11 executes an initial position calculation process of associating the three-dimensional position and the color information of each point. Details of the initial position calculation process will be described with reference to FIG. 6 described later.

In step S32, the patch generation unit 32 executes a patch generation process of generating connection information of each point. Details of the patch generation process will be described with reference to FIG. 7 described later.

In step S33, the movement vector calculation unit 12 executes a movement calculation process of calculating the movement direction and the movement vector of each point.

Details of the movement calculation process will be described with reference to FIG. 9 described later.

In step S34, the color correction unit 13 executes a color correction process of correcting the color information of each point. Details of the color correction process will be described with reference to FIG. 18 described later.

In step S35, the position correction unit 14 executes a position correction process of correcting the three-dimensional positions of the points of the boundaries of the occlusion areas based on the movement vectors. Details of the position correction process will be described with reference to FIG. 22 described later. After the process in step S35, the process returns to step S11 of FIG. 4 and proceeds to step S12.

Figure 6:
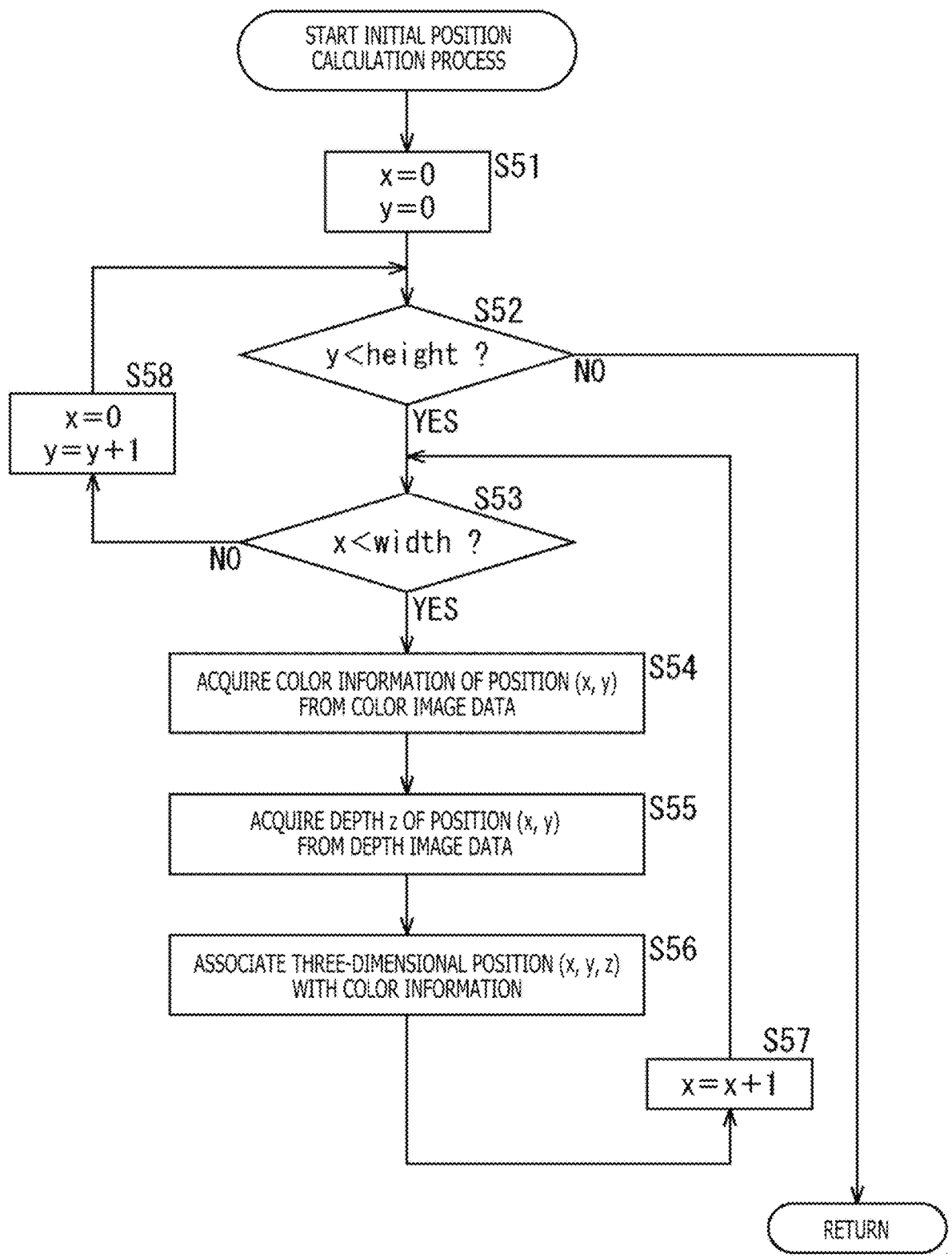
FIG. 6 is a flow chart describing details of an initial position calculation process in FIG. 5.

FIG. 6 is a flow chart describing the details of the initial position calculation process in step S31 of FIG. 5.

In step S51 of FIG. 6, the position calculation unit 31 sets x to 0, H indicating the number of the pixel as a processing target point (hereinafter, referred to as target point) from the left, and sets y to 0, y indicating the number of the pixel from the bottom.

In step S52, the position calculation unit 31 determines whether y is smaller than the number of pixels "height" of the color image data in the vertical direction is the input image data. If the position calculation unit 31 determines that y is smaller than the number of pixels "height" in step S52, the process proceeds to step S53.

In step S53, the position calculation unit 31 determines whether x is smaller than the number of pixels "width" of the color image data in the horizontal direction in the input image data. If the position calculation unit 31 determines that x is smaller than the number of pixels "width" in step S53, the process proceeds to step S54.

In step S54, the position calculation unit 31 acquires the color information of the position (x, y) of a pixel on the screen that is an xth pixel from the left and yth pixel from the bottom, from the color image data in the input image data.

In step S55, the position calculation unit 31 acquires a depth z of the position (x, y) from the depth image data in the input image data.

In step S56, the position calculation unit 31 associates the three-dimensional position (x, y, z) with the color information of the position (x, y) and supplies the three-dimensional position (x, y, z) to the patch generation unit 32.

In step S57, the position calculation unit 31 increments x by 1. The process then returns to step S53, and the process in steps S53 to S57 is repeated until x becomes equal to the number of pixels "width."

On the other hand, if the position calculation unit 31 determines that x is equal to or greater than the number of pixels "width" in step S53, that is, if all pixels of the yth row from the bottom are the target points, the process proceeds to step S58.

In step S58, the position calculation unit 31 sets x to 0 and increments y by 1. The process then returns to step S52, and the process in steps S52 to S58 is repeated until y becomes equal to the number of pixels "height."

On the other hand, if the position calculation unit 31 determines that y is equal to or greater than the number of pixels "height" in step S52, that is, if all pixels are the target points, the process returns to step S31 of FIG. 5 and proceeds to step S32.

Figure 7:
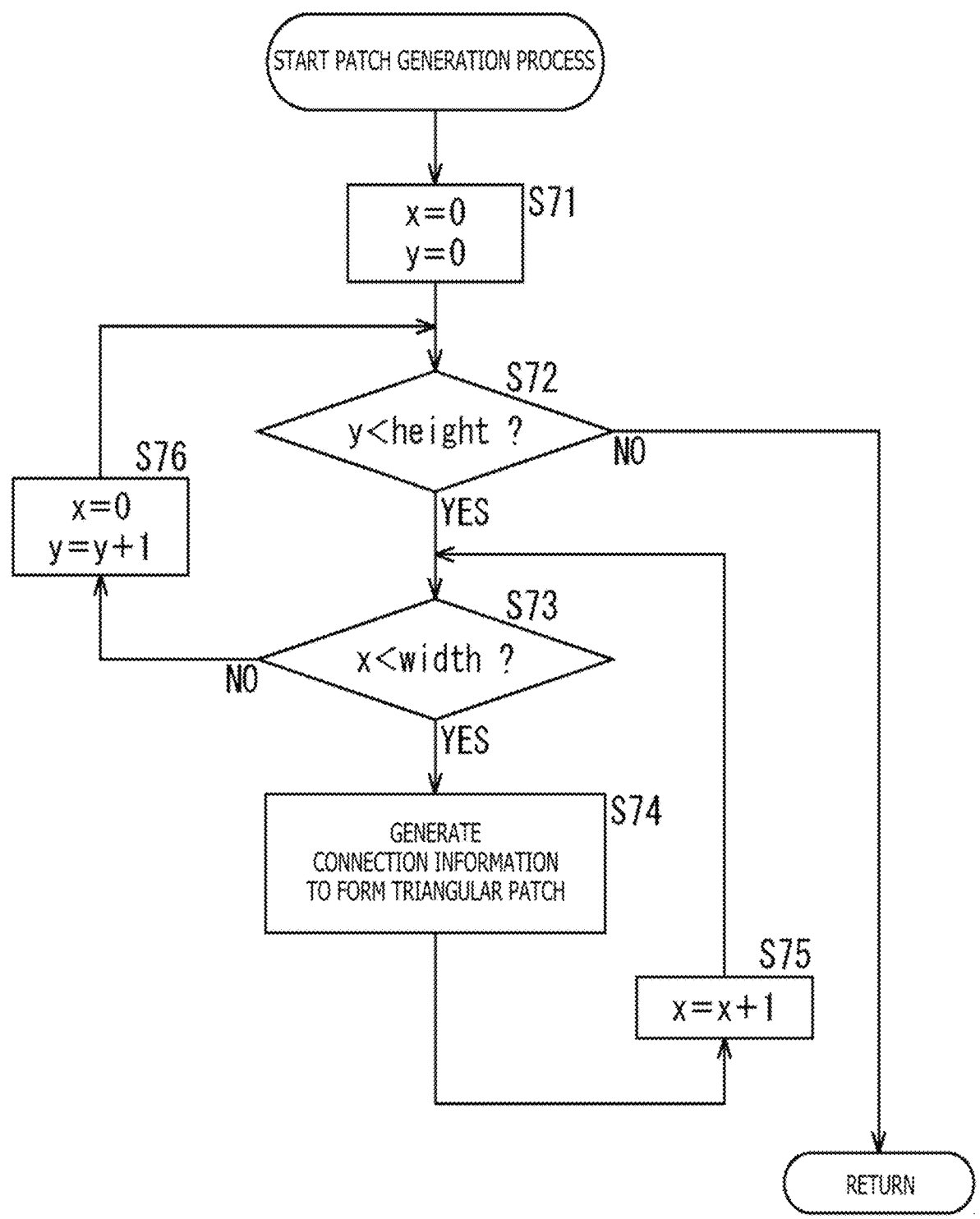
FIG. 7 is a flow chart describing details of a patch generation process in FIG. 5.

FIG. 7 is a flow chart describing details of the patch generation process in step S32 of FIG. 5.

The process in steps S71 to S73, S75, and S76 of FIG. 7 is similar to the process in steps S51 to S53, S57, and S58 of FIG. 6 except that the process is executed by the patch generation unit 32 instead of the position calculation unit 31, and the description will be appropriately omitted.

If the patch generation unit 32 determines that x is smaller than the number of pixels "width" in step S73, the process proceeds to step S74.

In step S74, the patch generation unit 32 generates connection information of the target point to form a triangular patch with the target point as a vertex based on the three-dimensional position (x, y, z) of the target point supplied from the position calculation unit 31. The process then proceeds to step S75.

Furthermore, if the patch generation unit 32 determines that y is equal to or greater than the number of pixels "height" in step S72, that is, if all pixels are the target points, the patch generation unit 32 supplies three-dimensional data including the three-dimensional position (x, y, z), the color information, and the connection information of each point to the movement vector calculation unit 12. The process then returns to step S32 of FIG. 5 and proceeds to step S33.

(Example of Triangular Patches)

Figure 8:
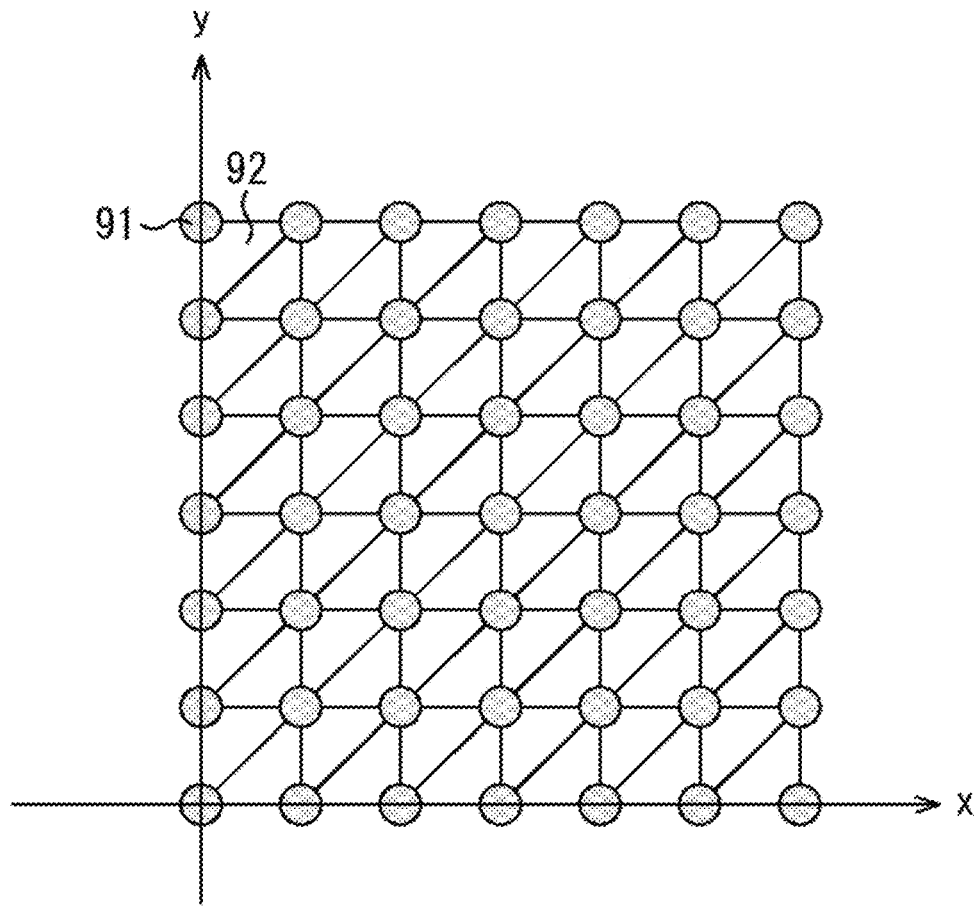
FIG. 8 depicts an example of triangular patches corresponding to connection information.

FIG. 8 depicts an example of triangular patches corresponding to the connection information generated by the patch generation unit 32 in FIG. 1.

The horizontal axis in FIG. 8 indicates the x-coordinate of the three-dimensional position (x, y, z) of each point 91, and the vertical axis indicates the y-coordinate. In addition, only 7×7 points 91 are described in FIG. 8 among the points 91 corresponding to the three-dimensional data.

As illustrated in FIG. 8, the patch generation unit 32 generates the connection information of each point 91 to form a triangular patch 92 with three neighboring points 91 as vertices, for example. Specifically, the patch generation unit 32 generates the connection information of each point 91 to mutually connect three points 91 excluding the lower right point 91 of each set of 2×2 points 91 and mutually connect three points 91 excluding the upper left point 91.

Figure 9:
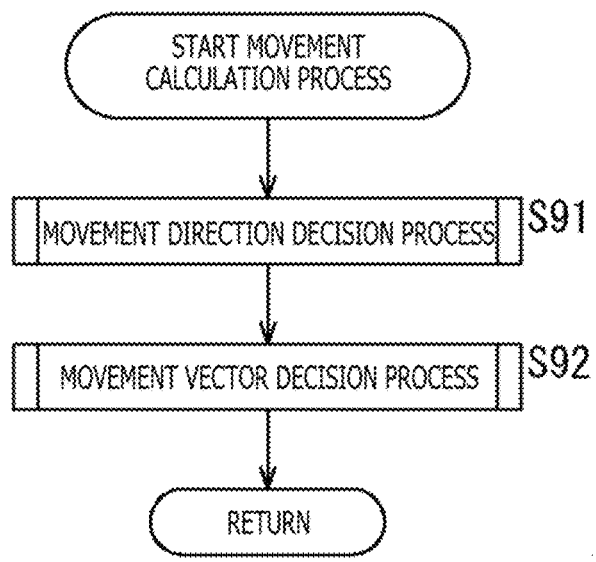
FIG. 9 is a flow chart describing details of a movement calculation process in FIG. 5.

FIG. 9 is a flow chart describing details of the movement calculation process in step S33 of FIG. 5.

In step S91 of FIG. 9, the movement vector calculation unit 12 executes a movement direction decision process of deciding movement directions of all points 91. Details of the movement direction decision process will be described with reference to FIG. 10 described later.

In step S92, the movement vector calculation unit 12 executes a movement vector decision process of deciding movement vectors of all points 91. Details of the movement vector decision process will be described with reference to FIG. 14 described later.

Figure 10:
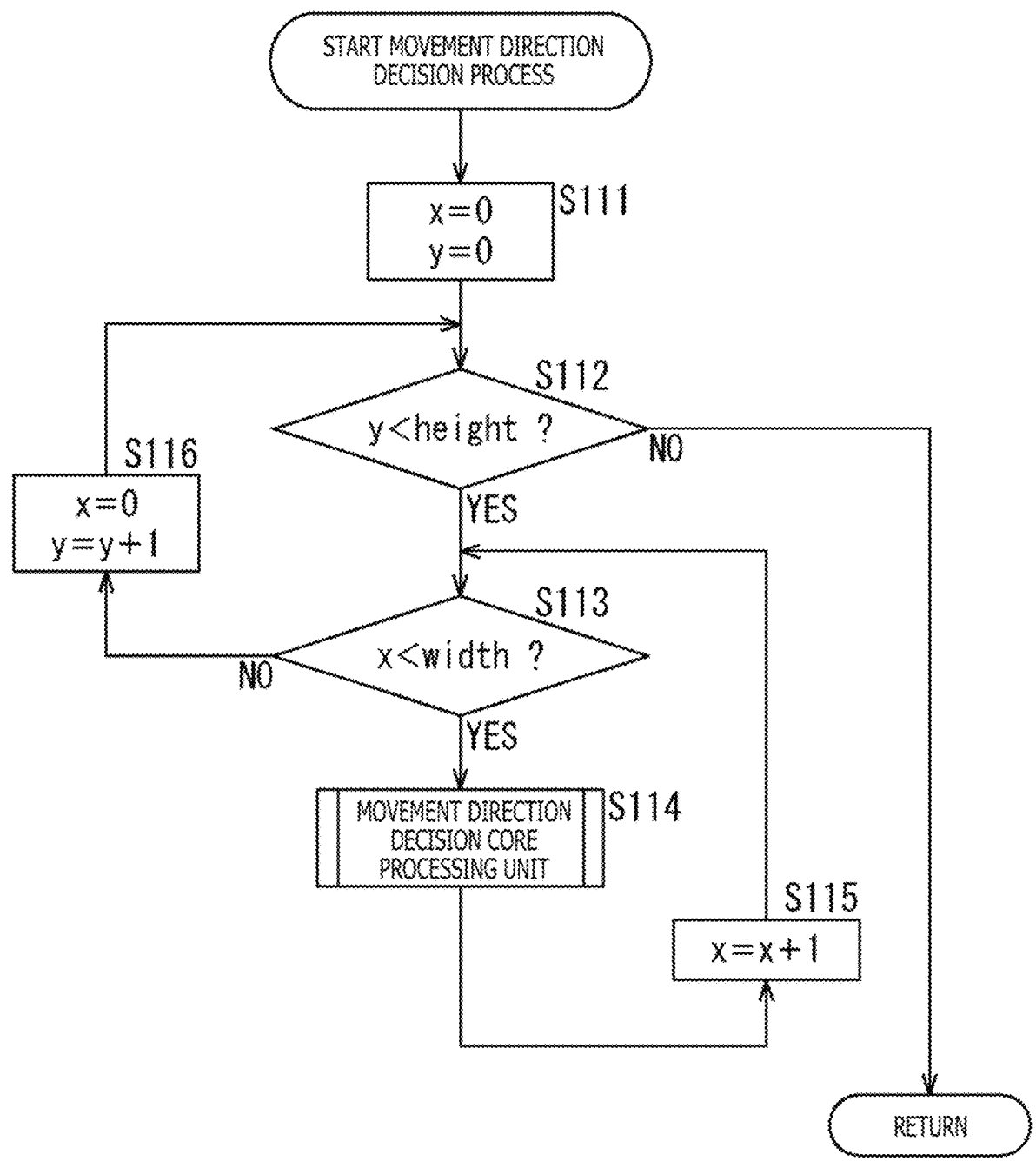
FIG. 10 is a flow chart describing details of a movement direction decision process in FIG. 9.

FIG. 10 is a flow chart describing the details of the movement direction decision process in step S91 of FIG. 9.

The process in steps S111 to S113, S115, and S116 of FIG. 10 is similar to the process in steps S51 to S53, S57, and S58 of FIG. 6 except that the process is executed by the movement vector calculation unit 12 instead of the position calculation unit 31, and the description will be appropriately omitted.

If the movement vector calculation unit 12 determines that x is smaller than the number of pixels "width" in step S113, the process proceeds to step S114.

In step S114, the movement vector calculation unit 12 executes a movement direction decision core process of deciding the movement direction of the target point. Details of the movement direction decision core process will be described with reference to FIG. 11 described later. After the process in step S114, the process proceeds to step S115.

Furthermore, if the movement vector calculation unit 12 determines that y is equal to or greater than the number of pixels "height" in step S112, that is, if all pixels are the target points, the movement vector calculation unit 12 supplies the movement directions of all points 91 to the color correction unit 13. The process then returns to step S91 of FIG. 9 and proceeds to step S92.

Figure 11:
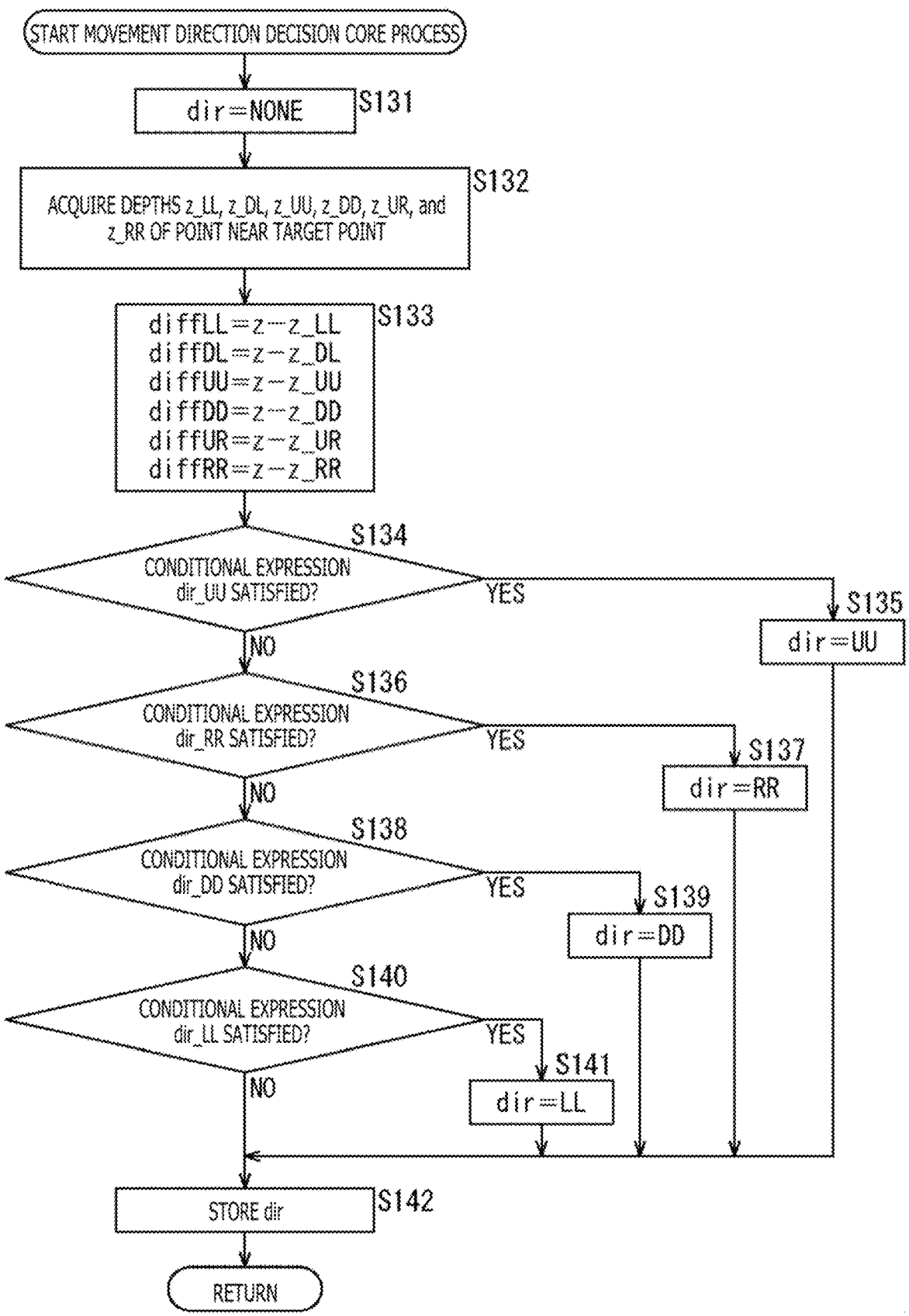
FIG. 11 is a flow chart describing details of a movement direction decision core process in FIG. 10.

FIG. 11 is a flow chart describing the details of the movement direction decision core process in step S114 of FIG. 10.

Figures 12, 13:
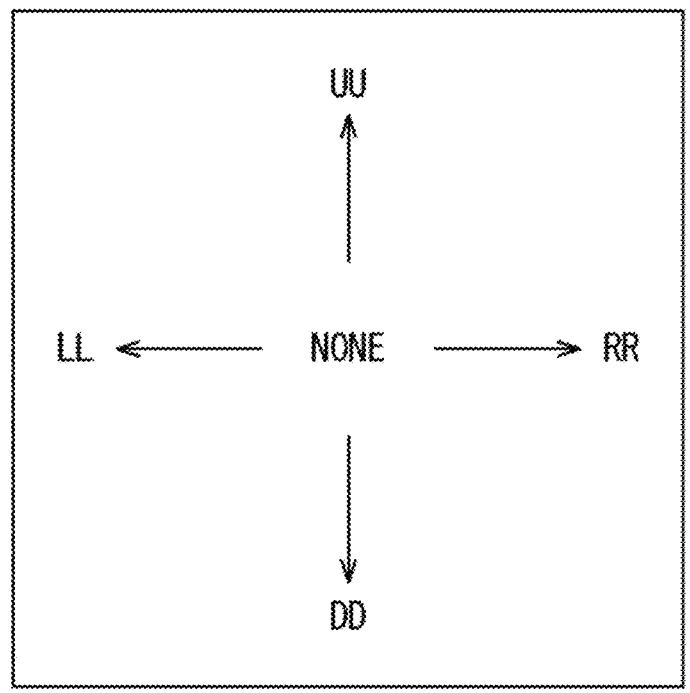
FIG. 12 depicts an example of movement directions.
FIG. 13 is a diagram describing two-dimensional positions corresponding to the depth.

In step S131 of FIG. 11, the movement vector calculation unit 12 sets a movement direction dir of the two-dimensional position of the target point on the screen to NONE indicating that the target point is not to be moved. Other than NONE, the movement direction dir can be set to UU indicating the upward direction, RR indicating the right direction, DD indicating the downward direction, or EL indicating the left direction as illustrated in FIG. 12.

In step S132, the movement vector calculation unit 12 acquires depths z_LL, z_DL, z_UU, z_DD, z_UR, and z_RR of the points 91 near the target point. The depths z_LL, z_DL, z_UU, z_DD, z_UR, and z_RR are depths of the points 91 on the left, lower left, above, below, upper right, and right of the target point, respectively. Specifically, as illustrated in FIG. 13, assuming that the two-dimensional position of the target point on the screen is (x, y), the depths z_LL, z_DL, z_UU, z_DD, z_UR, and z_RR are the depths of the points 91 at positions (x−1, y), (x−1, y−1), (x, y+1), (x, y−1), (x+1, y+1), and (x+1, y), respectively. Note that in FIG. 13, the squares indicate the pixels corresponding to the respective points 91.

In step S133, the movement vector calculation unit 12 obtains differences diffLL, diffDL, diffUU, diffDD, diffUR, and diffRR between the depth z of the target point and the depths z_LL, z_DL, z_UU, z_DD, z_UR, and z_RR, respectively.

In step S134, the movement vector calculation unit 12 determines whether a conditional expression dir_UU is satisfied. The conditional expression dir_UU is (diffLL>ThDepth && diffUU>ThDepth &&
    diffUR>ThDepth && diffRR<=ThDepth &&
    diffDD<=ThDepth && diffDL<=ThDepth)||

(diffLL<=ThDepth && diffUU>ThDepth &&
    diffUR>ThDepth && diffRR<=ThDepth &&
    diffDD<=ThDepth && diffDL<=ThDepth)||

(diffLL<=ThDepth && diffUU>ThDepth &&
    diffUR<=ThDepth && diffRR<=ThDepth &&
    diffDD<=ThDepth && diffDL<=ThDepth)||

(diffLL>ThDepth && diffUU>ThDepth &&
    diffUR>ThDepth && diffRR>ThDepth &&
    diffDD<=ThDepth && diffDL<=ThDepth).

Therefore, the movement vector calculation unit 12 determines that the conditional expression dir_UU is satisfied n a case where the differences diff_UU and diff_UR are greater than a threshold ThDepth, and the differences diff_RR, diff_DD, and diff_DL are equal to or smaller than the threshold ThDepth, in a case where only the difference diff_UU is greater than the threshold ThDepth, or in a case where only, differences diff_DD and diff_DL are equal to or smaller than the threshold ThDepth.

If the movement vector calculation unit 12 determines that the conditional expression dir_UU is satisfied in step S134, the movement vector calculation unit 12 detects the target point as a point 91 of the boundary of the occlusion area and advances the process to step S135. In step S135, the movement vector calculation unit 12 sets the movement direction dir to UU Indicating the upward direction. The process then proceeds to step S142.

On the other hand, if the movement vector calculation unit 12 determines that the conditional expression dir_UU Is not satisfied in step S134, the movement vector calculation unit 12 determines whether a conditional expression dir_RR is satisfied in step S136. The conditional expression dir_RR is (diffLL<=ThDepth && diffUU>ThDepth &&
    diffUR>ThDepth && diffRR>ThDepth &&
    diffDD<=ThDepth && diffDL<=ThDepth)||

(diffLL<=ThDepth && diffUU<=ThDepth &&
    diffUR>ThDepth && diffRR<=ThDepth &&
    diffDD<=ThDepth && diffDL<=ThDepth)||

(diffLL<=ThDepth && diffUU<=ThDepth &&
    diffUR>ThDepth && diffRR>ThDepth &&
    diffDD<=ThDepth && diffDL<=ThDepth)||

(diffLL<=ThDepth && diffUU<=ThDepth &&
    diffUR<=ThDepth && diffRR>ThDepth &&
    diffDD<=ThDepth && diffDL<=ThDepth)||

(diffLL<=ThDepth && diffUU<=ThDepth &&
    diffUR>ThDepth && diffRR>ThDepth &&
    diffDD>ThDepth && diffDL<=ThDepth)||

(diffLL<=ThDepth && diffUU>ThDepth &&
    diffUR>ThDepth && diffRR>ThDepth &&
    diffDD>ThDepth && diffDL<=ThDepth)||

(diffLL<=ThDepth && diffUU<=ThDepth &&
    diffUR>ThDepth && diffRR>ThDepth &&
    diffDD>ThDepth && diffDL>ThDepth)||

(diffLL<=ThDepth && diffUU<=ThDepth &&
    diffUR<=ThDepth && diffRR>ThDepth &&
    diffDD>ThDepth && diffDL<=ThDepth).

Therefore, the movement vector calculation unit 12 determines that the conditional expression dir_RR is satisfied in a case where the differences diff_UR and diff_RR are greater than the threshold ThDepth, the differences diff_LL and diff_DL are equal to or smaller than the threshold ThDepth, and at least one of the differences diff_UU and diff_DD is greater than the threshold ThDepth, in a case where the differences diff_LL, diff_UU, diff_DD, and dif_DL are equal to or smaller than the threshold. ThDepth, and at least one of the differences diff_UR and diff_RR is greater than the threshold ThDepth, or in a case where the difference diff_RR and the difference diff_DD are greater than the threshold ThDepth, the differences diff_LL and diff_UU are equal to or smaller than the threshold ThDepth, and both the difference diff_UR and the difference diff_DL are greater than the threshold ThDepth or equal to or smaller than the threshold. ThDepth.

If the movement vector calculation unit 12 determines that the conditional expression dir_RR is satisfied in step S136, the movement vector calculation unit 12 detects the target point as a point 91 of the boundary of the occlusion area and advances the process to step S137. In step S137, the movement vector calculation unit 12 sets the movement direction dir to RR indicating the right direction. The process then proceeds to step S142.

On the other hand, if the movement vector calculation unit 12 determines that the conditional expression dir_RR is not satisfied in step S136, the movement vector calculation unit 12 determines whether a conditional expression dir_DD is satisfied in step S138. The conditional expression dir_DD is (diffLL<=ThDepth && diffUU<=ThDepth &&
    diffUR<=ThDepth && diffRR>ThDepth &&
    diffDD>ThDepth && diffDL>Th Depth)||

(diffLL<=ThDepth && diffUU<=ThDepth &&
    diffUR<=ThDepth && diffRR<=ThDepth &&
    diffDD>ThDepth && diffDL<=ThDepth)||

(diffLL<=ThDepth && diffUU<=ThDepth &&
    diffUR<=ThDepth && diffRR<=ThDepth &&
    diffDD>ThDepth && diffDL>=ThDepth)||

(diffLL>ThDepth && diffUU<=ThDepth &&
    diffUR<=ThDepth && diffRR>=ThDepth &&
    diffDD>ThDepth && diffDL>ThDepth).

Therefore, the movement vector calculation unit 12 determines that the conditional expression dir_DD is satisfied in a case where the differences diff_DD and diff_DL are greater than the threshold ThDepth, and the differences diff_LL, diff_UU, and diff_UR are equal to or smaller than the threshold ThDepth, in a case where only the difference diff_DD is greater than the threshold ThDepth, or in a case where only the differences diff_UU and diff_UR are equal to or smaller than the threshold ThDepth.

If the movement vector calculation unit 12 determines that the conditional expression dir_DD is satisfied in step S138, the movement vector calculation unit 12 detects the target point as a point 91 of the boundary of the occlusion area and advances the process to step S139. In step S139, the movement vector calculation unit 12 sets the movement direction dir to DD Indicating the downward direction. The process then proceeds to step S142.

On the other hand, if the movement vector calculation unit 12 determines that the conditional expression dir_DD Is not satisfied in step S138, the movement vector calculation unit 12 determines whether a conditional expression dir_LL is satisfied in step S140. The conditional expression dir_LL is (diffLL>ThDepth && diffUU<=ThDepth &&
    diffUR<=ThDepth && diffRR<=ThDepth &&
    diffDD>ThDepth && diffDL>ThDepth)||

(diffLL<=ThDepth && diffUU<=ThDepth &&
    diffUR<=ThDepth && diffRR<=ThDepth &&
    diffDD<=ThDepth && diffDL>ThDepth)||

(diffLL>ThDepth && diffUU>ThDepth &&
    diffUR<=ThDepth && diffRR<=ThDepth &&
    diffDD<=ThDepth && diffDL>ThDepth)||

(diffLL>ThDepth && diffUU<=ThDepth &&
    diffUR<=ThDepth && diffRR<=ThDepth &&
    diffDD<=ThDepth && diffDL<=ThDepth)||

(diffLL>ThDepth && diffUU<=ThDepth &&
    diffUR<=ThDepth && diffRR<=ThDepth &&
    diffDD<=ThDepth && diffDL>ThDepth)||

(diffLL>ThDepth && diffUU>ThDepth &&
    diffUR<=ThDepth && diffRR<=ThDepth &&
    diffDD>ThDepth && diffDL>ThDepth)||

(diffLL>ThDepth && diffUU>ThDepth &&
    diffUR>ThDepth && diffRR<=ThDepth &&
    diffDD>ThDepth && diffDL>ThDepth)||

(diff=>ThDepth && diffUU>ThDepth &&
    diffUR<=ThDepth && diffRR<=ThDepth &&
    diffDD<=ThDepth && diffDL<=ThDepth).

Therefore, the movement vector calculation unit 12 determines that the conditional expression dir_LL is satisfied in a case where the differences diff_LL and diff_DL are greater than the threshold ThDepth, the differences diff_UR and diff_RR are equal to or smaller than the threshold ThDepth, and at least one of the differences diff_UU and diff_DD is greater than the threshold ThDepth, in a case where the differences diff_UU, diff_UR, diff_RR, and dif_DD are equal to or smaller than the threshold ThDepth, and at least one of the differences diff_LL and diff_DL is greater than the threshold ThDepth, or in a case where the difference diff_LL and difference diff_UU are greater than the threshold ThDepth, the differences diff_RR and diff_DD are equal to or smaller than the threshold ThDepth, and both the difference diff_DR and the difference diff_DL are greater than the threshold ThDepth or equal to or smaller than the threshold ThDepth.

If the movement vector calculation unit 12 determines that the conditional expression dir_LL is satisfied in step S140, the movement vector calculation unit 12 detects the target point as a point 91 of the boundary of the occlusion area and advances the process to step S141. In step S141, the movement vector calculation unit 12 sets the movement direction dir to LL indicating the left direction. The process then proceeds to step S142.

In step S142, the movement vector calculation unit 12 stores the movement direction dir of the target point. The process then returns to step S114 of FIG. 10 and proceeds to step S115.

In this way, if the target point satisfies the conditional expression dir_UU, dir_RR, dir_DD, or dir_LL, the movement vector calculation unit 12 detects the target point as a point 91 of the boundary of the occlusion area and sets the movement direction dir of the target point to a value other than NONE.

Figure 14:
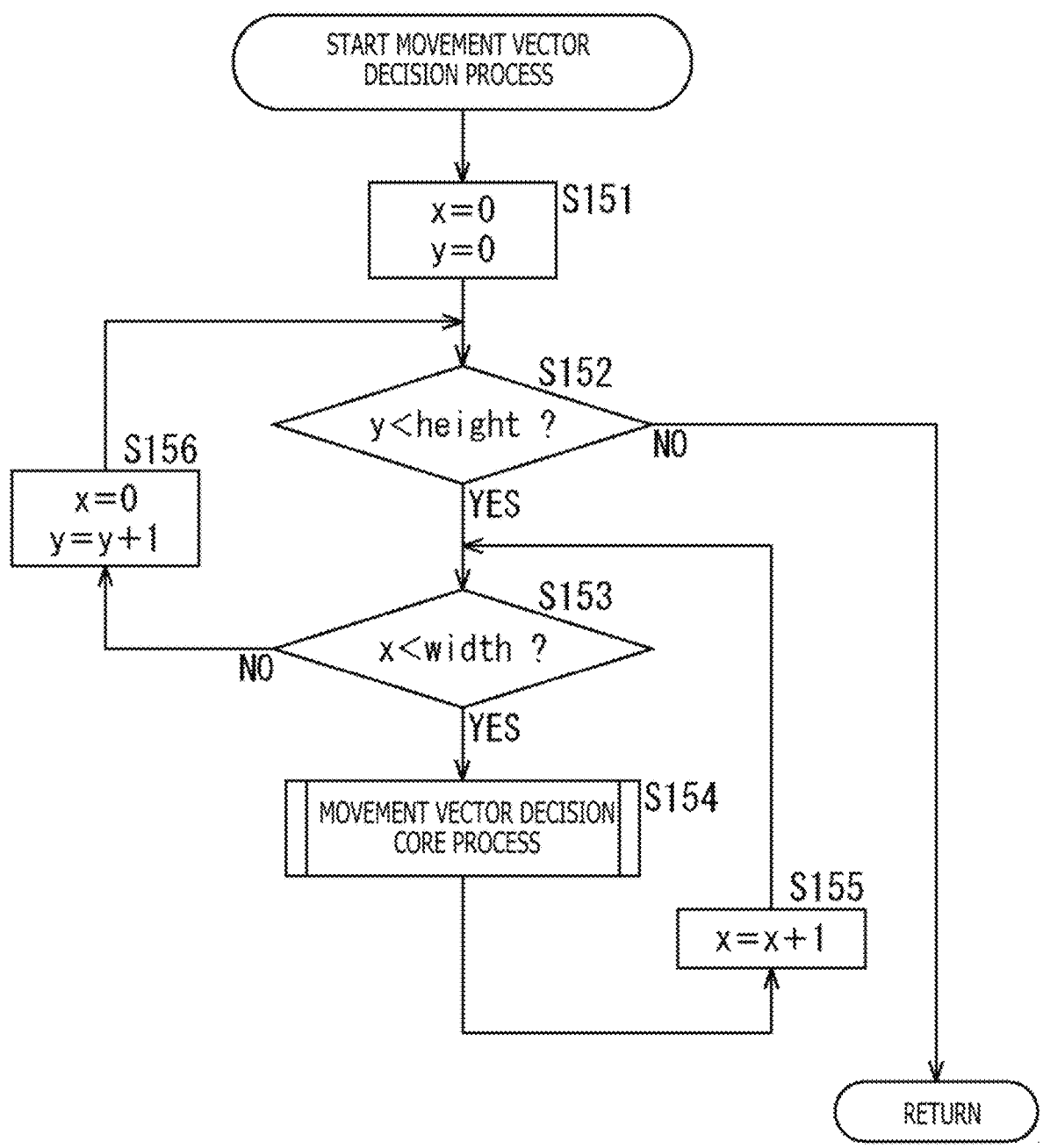
FIG. 14 is a flow chart describing details of a movement vector decision process in FIG. 9.

FIG. 14 is a flow chart describing the details of the movement vector decision process in step S92 of FIG. 9.

The process in steps S151 to S153, S155, and S156 of FIG. 14 is similar to the process in steps S51 to S53, S57, and S58 of FIG. 6 except that the process is executed by the movement vector calculation unit 12 instead of the position calculation unit 31, and the description will be appropriately omitted.

If the movement vector calculation unit 12 determines that x is smaller than the number of pixels "width" in step S153, the process proceeds to step S154.

In step S154, the movement vector calculation unit 12 executes a movement vector decision core process of deciding the movement vector of the target point. Details of the movement vector decision core process will be described with reference to FIG. 15 described later. After the process in step S154, the process proceeds to step S155.

Furthermore, if the movement vector calculation unit 12 determines that y is equal to or greater than the number of pixels "height" in step S152, that is, if all pixels are the target points, the movement vector calculation unit 12 supplies the movement vectors and the three-dimensional data of all points 91 to the color correction unit 13. The process then returns to step S92 of FIG. 9, returns to step S33 of FIG. 5, and proceeds to step S34.

Figure 15:
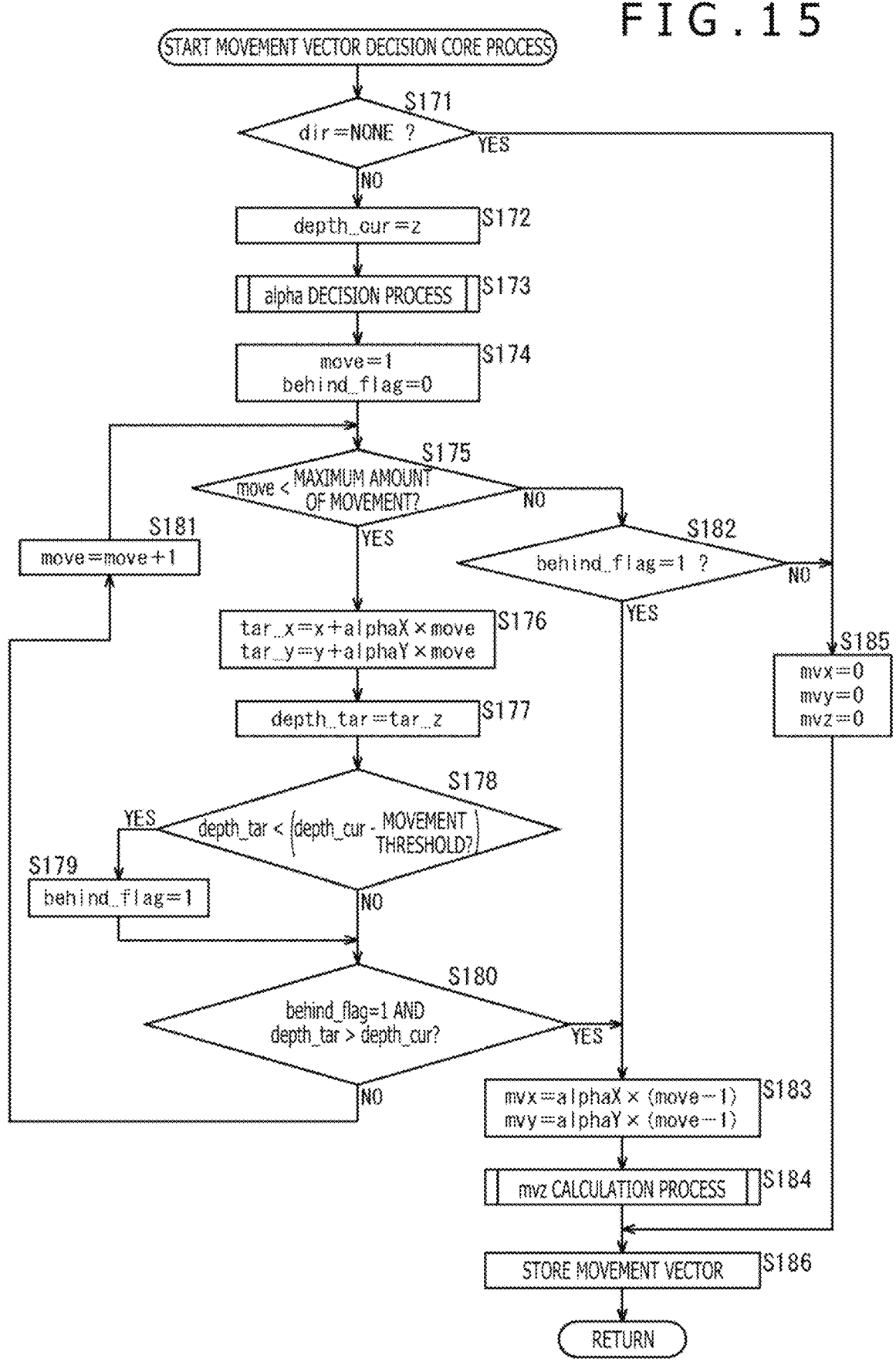
FIG. 15 is a flow chart describing details of a movement vector decision core process in FIG. 14.

FIG. 15 is a flow chart describing the details of the movement vector decision core process in step S154 of FIG. 14.

In step S171 of FIG. 15, the movement vector calculation unit 12 determines whether the movement direction dir of the target point is NONE. If the movement vector calculation unit 12 determines that the movement direction of the target point is not NONE in step S171, the movement vector calculation unit 12 sets depth_cur to the depth z of the target point in step S172.

In step S173, the movement vector calculation unit 12 executes an alpha decision process of deciding alphaX indicating whether the x-coordinate is positive or negative and alphaY indicating whether the y-coordinate is positive or negative in the direction indicated by the movement direction dir. Details of the alpha decision process will be described with reference to FIG. 16 described later.

In step S174, the movement vector calculation unit 12 sets "move" to 1, "move" representing the number of pixels indicating the amount of movement of the target point. The movement vector calculation unit 12 also sets behind_flag to 0.

The behind_flag is a flag indicating whether the target point is on the far side of the position of the point 91 in the depth direction, in which the two-dimensional position of the point 91 on the screen is a position (taz_x, tar_y) obtained in step S176 described later. The behind_flag is 1 in the case of indicating that the target point is on the far side of the position of the point 91 in the depth direction, in which the two-dimensional position of the point 91 on the screen is the position (tar_x, tar_y), and is 0 in the case of indicating that the target point is not on the far side.

In step S175, the movement vector calculation unit 12 determines whether "move" is smaller than a maximum amount of movement. The maximum amount of movement is decided according to a possible range of the virtual viewpoint. If the movement vector calculation unit 12 determines that "move" is smaller than the maximum amount of movement in step S175, the process proceeds to step S176.

In step S176, the movement vector calculation unit 12 adds the x-coordinate of the target point and a product of "move" and alphaX to obtain tar_x. The movement vector calculation unit 12 also adds the y-coordinate of the target point and a product of "move" and alphaY to obtain tar_y.

In step S177, the movement vector calculation unit 12 sets a depth tar_z of the point 91 in which the two-dimensional position on the screen is the position (tar_x, tar_y) to depth_tar. In step S178, the movement vector calculation unit 12 determines whether depth_tar is smaller than a value obtained by subtracting a movement threshold from depth_cur. The movement threshold is set in consideration of an error in the depth.

If the movement vector calculation unit 12 determines that depth_tar is equal to or greater than the value obtained by subtracting the movement threshold from depth_cur in step S178, the movement vector calculation unit. 12 determines that the target point is on the near side of the point 91 at the position (tar_x, tar_y) and advances the process to step S180.

On the other hand, if the movement vector calculation unit 12 determines that depth_tar is smaller than the value obtained by subtracting the movement threshold from depth_cur in step S178, the movement vector calculation unit 12 determines that the target point is on the far side of the point 91 at the position (tar_x, tar_y) and advances the process to step S179.

In step S179, the movement vector calculation unit 12 sets behind flag to 1 and advances the process to step S180.

In step S180, the movement vector calculation unit 12 determines whether behind_flag is 1 and depth_tar is greater than depth_cur.

In step S180, if behind_flag is 1 and depth_tar is greater than depth_cur, that is, if the state that the point 91 at the position (tar_x, tar_y) is on the near side of the target point is changed to the state that the point 91 is on the far side, the process proceeds to step S183.

On she other hand, in step S180, if behind_flag is not 1 or if depth_tar is equal to or smaller than depth_cur, that is, if all of the points 91 at the position (tar_x, tar_y) are on the far side of the target point or if the state that the point 91 at the position (tar_x, tar_y) is on the near side of the target point is not changed to the state that the point 91 is on the far side, the process proceeds to step S181.

In step S181, the movement vector calculation unit 12 increments "move" by 1 and returns the process to step S175 to repeat the subsequent process.

Furthermore, if the movement vector calculation unit 12 determines that "move" is equal to or greater than the maximum amount of movement in step S175, the process proceeds to step S182. In step S182, the movement vector calculation unit 12 determines whether behind_flag is 1.

If the movement vector calculation unit 12 determines that behind_flag is 1 in step S182, that is, if the state that the point 91 at the position (tar_x, tar_y) is on the near side of the target point is not changed to the state that the point 91 is on the far side, the process proceeds to step S183.

In step S183, the movement vector calculation unit 12 decides that an x-component mvx of the movement vector of the target point is a product of alphaX and (move-1) and decides that a y-component mvy is a product of alpha Y and (move-1).

More specifically, in the case where the state that the point 91 at the position (tar_x, tar_y) is on the near side of the target point is changed to the state that the point 91 is on the far side or in the case where "move" becomes equal to the maximum amount of movement without the change of the state that the point 91 at the position (tar_x, tar_y) is on the near side of the target point to the state that the point 91 is on the far side, the movement vector calculation unit 12 sets the last "move," that is, a value obtained by subtracting 1 from current "move," as final "move" and decides the x-component mvx and the y-component mvy.

In step S184, the movement vector calculation unit 12 executes an mvz calculation process of calculating a z-component mvz of the movement vector of the target point. Details of the mvz calculation process will be described with reference to FIG. 17 described later. After the process in step S184, the process proceeds to step S186.

On the other hand, if the movement vector calculation unit 12 determines that the movement direction dir is NONE in step S171, that is, if the target point is not a point of the boundary of the occlusion area, the process proceeds to step S185. Furthermore, if the movement vector calculation unit 12 determines that behind_flag is not 1 in step S182, that is, if the point 91 at the position (tar_x, tar_y) is never on the near side of the target point from the time that "move" is 0 to the time that "move" becomes equal to the maximum amount of movement, the process proceeds to step S185.

In step S185, the movement vector calculation unit 12 sets the x-component mvx, the y-component mvy, and the z-component mvz to 0 and advances the process to step S186.

In step S186, the movement vector calculation unit 12 saves the movement vector (mvx, mvy, mvz), returns the process to step S154 of FIG. 14, and advances the process to step S155.

In this way, in the case where the target point is a point 91 of the boundary of the occlusion area, and there is a point 91 near the target point on the near side of the target point in the direction indicated by the movement direction dir from the target point, the movement vector calculation unit 12 decides the x-component mvx and the y-component mvy for moving the two-dimensional position of the target point to the two-dimensional position of the point 91 (reference point).

Figure 16:
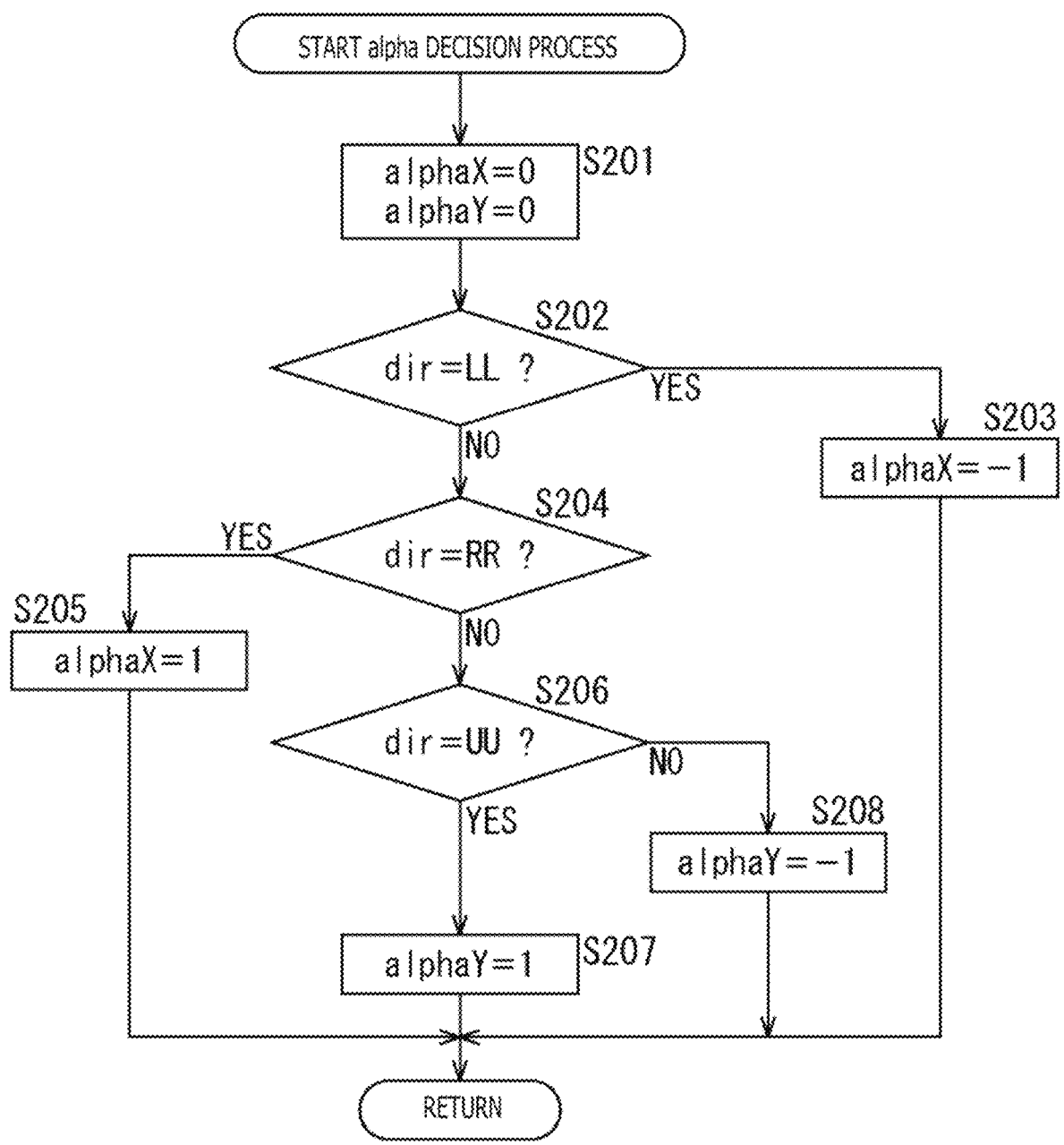
FIG. 16 is a flow chart describing an alpha decision process in FIG. 15.

FIG. 16 is a flow chart describing the alpha decision process in step S173 of FIG. 15.

In step S201 of FIG. 16, the movement vector calculation unit 12 sets alphaX and alphaY to 0.

In step S202, the movement vector calculation unit 12 determines whether the movement direction dir is LL. If the movement vector calculation unit 12 determines that the movement direction dir is LL in step S202, the movement vector calculation unit 12 sets alphaX to −1 in step S203. The process then returns to step S173 of FIG. 15 and proceeds to step S174.

On the other hand, if the movement vector calculation unit 12 determines that the movement direction dir is not LL in step S202, the movement vector calculation unit 12 determines whether the movement direction dir is PR in step S204. If the movement vector calculation unit 12 determines that the movement direction dir is RR in step S204, the movement vector calculation unit 12 sets alphaX to 1 in step S205. The process then returns to step S173 of FIG. 15 and proceeds to step S174.

Furthermore, if the movement vector calculation unit 12 determines that the movement direction dir is not PR in step S204, the movement vector calculation unit 12 determines whether the movement direction dir is UU in step S206. If the movement vector calculation unit 12 determines that the movement direction dir is UU in step S206, the movement vector calculation unit 12 sets alphaY to 1 in step S207. The process then returns to step S173 of FIG. 15 and proceeds to step S174.

On the other hand, if the movement vector calculation unit 12 determines that the movement direction dir is not UU in step S206, that is, if the movement direction dir is DD, the movement vector calculation unit 12 sets alphaY to −1 in step S208. The process then returns to step S173 of FIG. 15 and proceeds to step S174.

Figure 17:
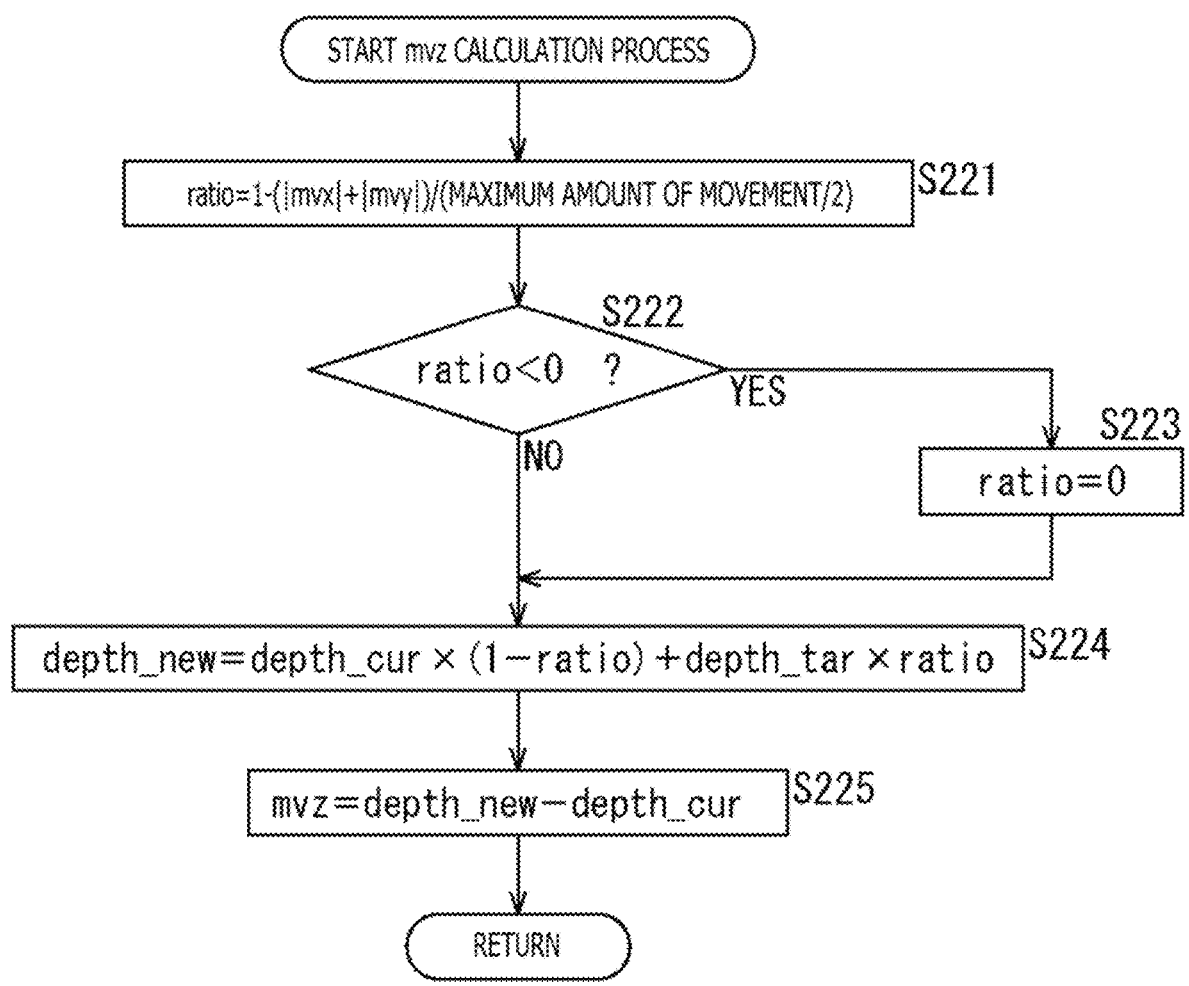
FIG. 17 is a flow chart describing details of an mvz calculation process in FIG. 15.

FIG. 17 is a flow chart describing the details of the mvz calculation process in step S184 of FIG. 15.

In step S221 of FIG. 17, the movement vector calculation unit 12 sets a ratio "ratio" to a value obtained by dividing a sum of the absolute values of the x-component mvx and the y-component mvy of the movement vector of the target point by a half the maximum amount of movement and subtracting the value from 1. The ratio "ratio" is a ratio of the depth depth_tar of the point 91 at the position (tar_x, tar_y) with respect to a depth depth_new of the target point after the movement.

In step S222, the movement vector calculation unit 12 determines whether the ratio "ratio" is smaller than 0. If the movement vector calculation unit 12 determines that the ratio "ratio" is equal to or greater than 0 in step S222, that is, if the sum of the x-component mvx and the y-component mvy is equal to or smaller than the half the maximum amount of movement, the process proceeds to step S224.

On the other hand, if the movement vector calculation unit 12 determines that the ratio "ratio" is smaller than 0 in step S222, that is, if the sum of the x-component mvx and the y-component mvy is greater than the half the maximum amount of movement, the process proceeds to step S223. In step S223, the movement vector calculation unit 12 changes the ratio "ratio" to 0 and advances the process to step S224.

In step S224, the movement vector calculation unit 12 sets the depth depth new of the target point after the movement to a sum of a value obtained by multiplying the depth depth_cur before the movement by (1-ratio) and a value obtained by multiplying the depth depth_tar of the point 91 (reference point) at the position (tar_x, tar_y) by "ratio."

In step S225, the movement vector calculation unit 12 decides a value obtained by subtracting the depth depth_cur of the target point before the movement from the depth depth_new of the target point after the movement as the z-component mvz of the movement vector of the target point. The process then returns to step S184 of FIG. 15 and proceeds to step S186.

In this way, if the sum of the x-component mvx and the y-component mvy of the movement vector of the target point is smaller than the half the maximum amount of movement as a threshold, the movement vector calculation unit 12 sets the z-component mvz of the movement vector of the target point to a value other than 0.

Although the half the maximum amount of movement is handled as the threshold to decide whether to set the z-component mvz of the movement vector of the target point to a value other than 0 or set the z-component mvz to 0 in the example of FIG. 17, the threshold is not limited to the half the maximum amount of movement.

Figure 18:
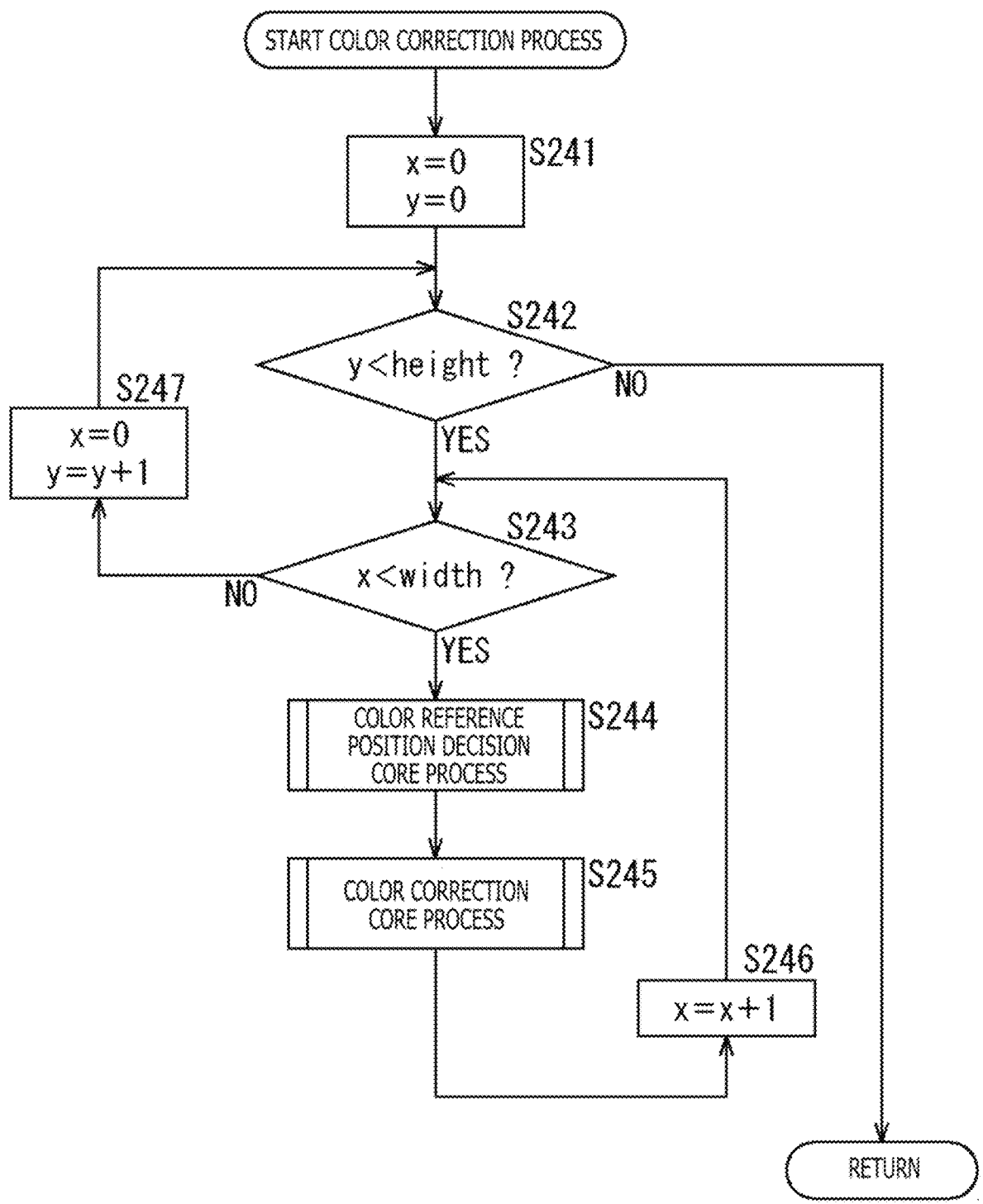
FIG. 18 is a flow chart describing details of a color correction process in FIG. 5.

FIG. 18 is a flow chart describing the details of the color correction process in step S34 of FIG. 5.

The process in steps S241 to S243, S246, and S247 of FIG. 18 is similar to the process in steps S51 to S53, S57, and S58 of FIG. 6 except that the process is executed by the color correction unit 13 instead of the position calculation unit 31, and the description will be appropriately omitted.

If the color correction unit 13 determines that is smaller than the number of pixels "width" in step S243, the process proceeds to step S244.

In step S244, the color correction unit 13 executes a color reference position decision core process of deciding the position of the point 91 corresponding to the color information referenced in the correction of the color information of the target point. Details of the color reference position decision core process will be described with reference to FIG. 19 described later.

In step S245, the color correction unit 13 executes a color correction core process of correcting the color information of the target point. Details of the color correction core process will be described with reference to FIG. 21 described later. After the process in step S245, the process proceeds to step S246.

Furthermore, if the color correction unit 13 determines that y is equal to or greater than the number of pixels "height" in step S242, that is, if all pixels are the target points, the color correction unit 13 supplies the three-dimensional data including the corrected color information and the movement vectors (mvx, mvy, mvz) supplied from the movement vector calculation unit 12 to the position correction unit 14. The process then returns to step S34 of FIG. 5 and proceeds to step S35.

Figure 19:
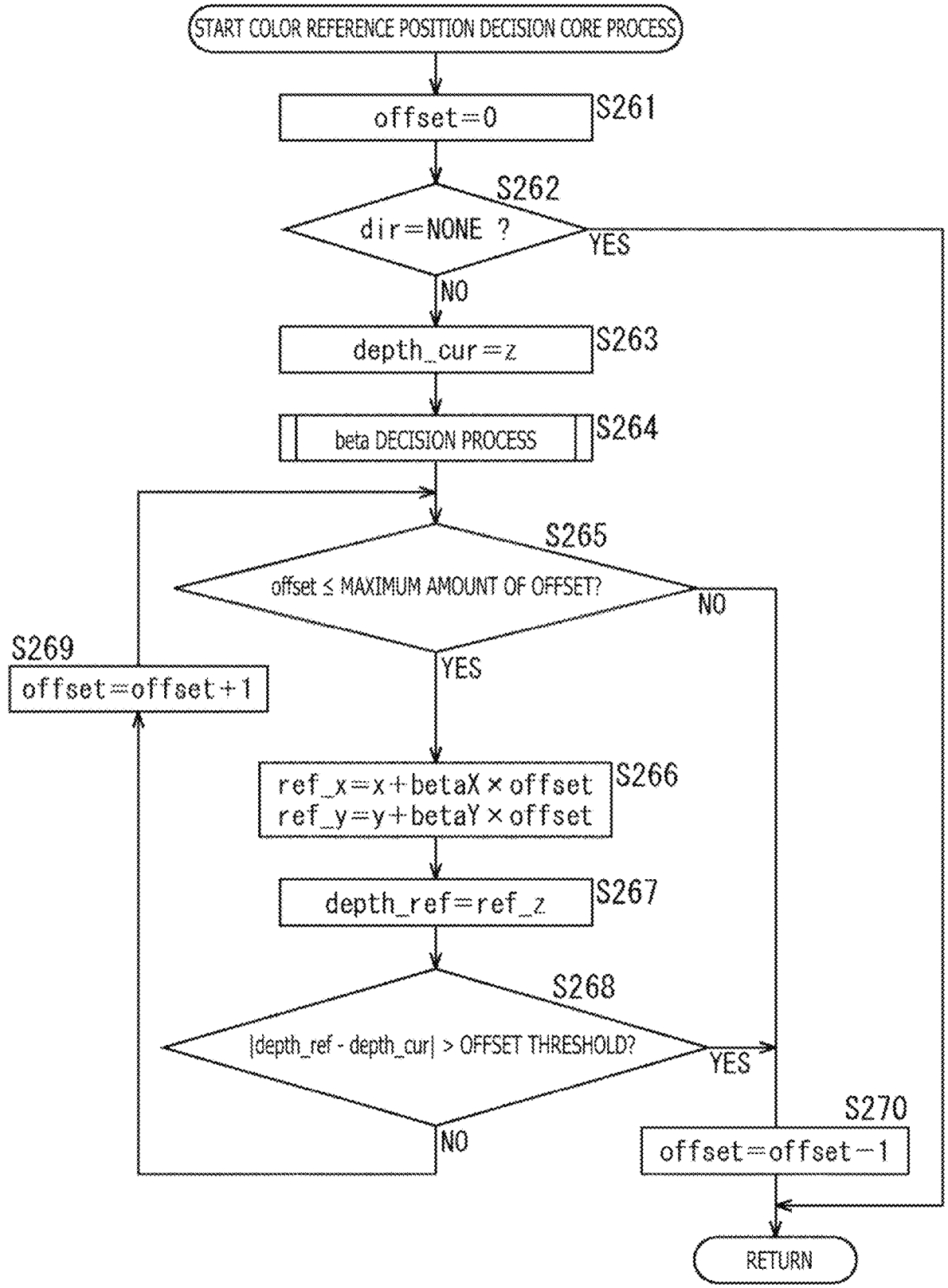
FIG. 19 is a flow chart describing details of a color reference position decision core process in FIG. 18.

FIG. 19 is a flow chart describing the details of the color reference position decision core process in step S244 of FIG. 18.

In step S261 of FIG. 19, the color correction unit sets "offset" to 0. In step S262, the color correction unit 13 determines whether the movement direction dir supplied from the movement vector calculation unit 12 is NONE. If the color correction unit 13 determines that the movement direction dir is not NONE in step S262, the process proceeds to step S263.

In step S263, the color correction unit 13 sets depth_cur to the depth z of the target point. In step S264, the color correction unit 13 executes a beta decision process of deciding betaX indicating whether the x-coordinate is positive or negative and betaY indicating whether the y-coordinate is positive or negative in a direction opposite the direction indicated by the movement direction dir. Details of the beta decision process will be described with reference to FIG. 20 described later.

In step S265, the color correction unit 13 determines whether "offset" is equal to or smaller than a maximum amount of offset. If the color correction unit 13 determines that "offset" is equal to or smaller than the maximum amount of offset in step S265, the process proceeds to step S266.

In step S266, the color correction unit 13 sets an x-coordinate ref_x of the position of the point 91 corresponding to the color information referenced in the correction of the color information of the target point to a sum of the x-coordinate of the target point and a product of betaX and "offset." The color correction unit 13 further sets a y-coordinate ref_y of the position of the point 91 corresponding to the color information referenced in the correction of the color information of the target point to a sum of the y-coordinate of the target point and a product of betaY and "offset."

In step S267, the color correction unit 13 sets depth_ref to a depth ref_z of the point 91 at the position (ref_x, ref_y). In step S268, the color correction unit 13 determines whether the absolute value of a value obtained by subtracting depth_cur from depth_ref is greater than an offset threshold.

If the color correction unit 13 determines that the absolute value of the value obtained by subtracting depth_cur from depth_ref is equal to or smaller than the offset threshold in step S268, the color correction unit 13 determines that the target point and the subject of the point 91 at the position (ref_x, ref_y) are the same and advances the process to step S269. In step S269, the color correction unit 13 increments "offset" by 1 and returns the process to step S265 to repeat the subsequent process.

On the other hand, if the color correction unit 13 determines that the absolute value of the value obtained by subtracting depth_cur from depth_ref is greater than the offset threshold in step S268, the color correction unit 13 determines that the target point and the subject of the point 91 at the position (ref_x, ref_y) are different and advances the process to step S270.

Furthermore, if the color correction unit 13 determines that "offset" is greater than the maximum amount of offset in step S265, the process proceeds to step S270.

In step S270, the color correction unit 13 decrements "offset" by 1. More specifically, the color correction unit 13 sets the last "offset" as final "offset" in the case where the target point and the subject of the point 91 at the position (ref_x, ref_y) are different or in the case where "offset" exceeds the maximum amount of offset without the change of the state that the target point and the subject of the point 91 at the position (ref_x, ref_y) are the same to the state that the target point and the subject are different. The process then returns to step S244 of FIG. 18 and proceeds to step S245.

On the other hand, if the color correction unit 13 determines that the movement direction dir is NONE in step S262, that is, if the target point is not the point 91 of the boundary of the occlusion area, the process returns to step S244 of FIG. 18 and proceeds to step S245.

In this way, in the case where the point 91 of the boundary of the occlusion area is the target point, the final position (ref_x, ref_y) is the two-dimensional position of the point 91 farthest from the target point in which the difference in the position in the depth direction from the target point continuous with the target point is equal to or smaller than the offset threshold.

Figure 20:
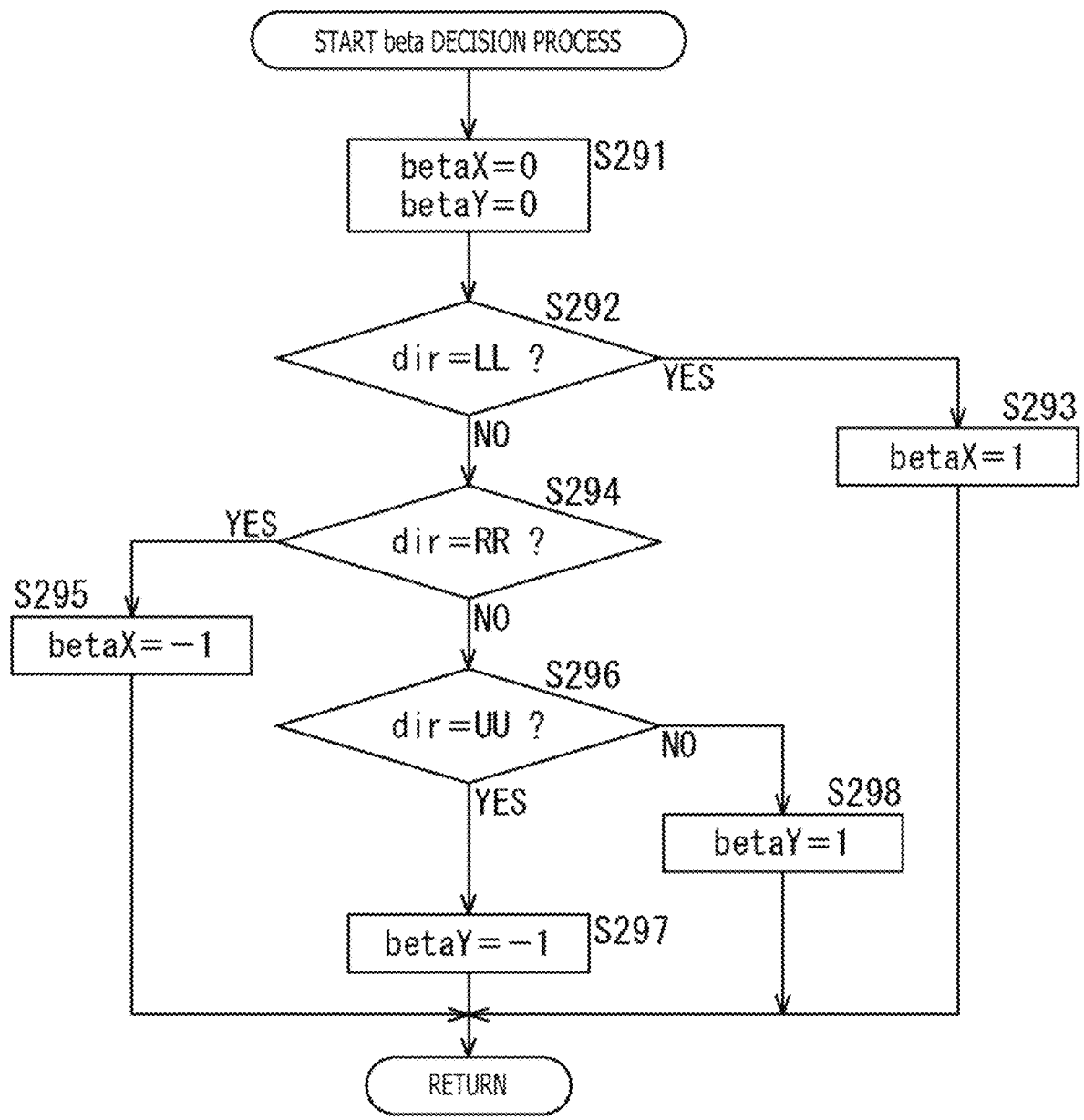
FIG. 20 is a flow chart describing details of a beta decision process in FIG. 19.

FIG. 20 is a flow chart describing the details of the beta decision process in step S264 of FIG. 19.

In step S291 of FIG. 20, the color correction unit 13 sets betaX and betaY to 0.

In step S292, the color correction unit 13 determines whether the movement direction dir is LL. If the color correction unit 13 determines that the movement direction dir is LL in step S292, the color correction unit 13 sets betaX to 1 in step S293. The process then returns to step S264 of FIG. 19 and proceeds to step S265.

On the other hand, if the color correction unit 13 determines that the movement direction dir is not LL in step S292, the color correction unit 13 determines whether the movement direction dir is RR in step S294. If the color correction unit 13 determines that the movement direction dir is RR in step S294, the color correction unit 13 sets betaX to −1 in step S295. The process then returns to step S264 of FIG. 19 and proceeds to step S265.

Furthermore, the color correction unit 13 determines that the movement direction dir is not RR in step S294, the color correction unit 13 determines whether the movement direction dir is UU in step S296. If the color correction unit 13 determines that the movement direction dir is UU in step S296, the color correction unit 13 sets betaY to −1 in step S297. The process then returns to step S264 of FIG. 19 and proceeds to step S265.

On the other hand, if the color correction unit 13 determines that the movement direction dir is not UU in step S296, that is, if the movement direction dir is DD, the color correction unit 13 sets betaY to 1 in step S298. The process then returns to step S264 of FIG. 19 and proceeds to step S265.

Figure 21:
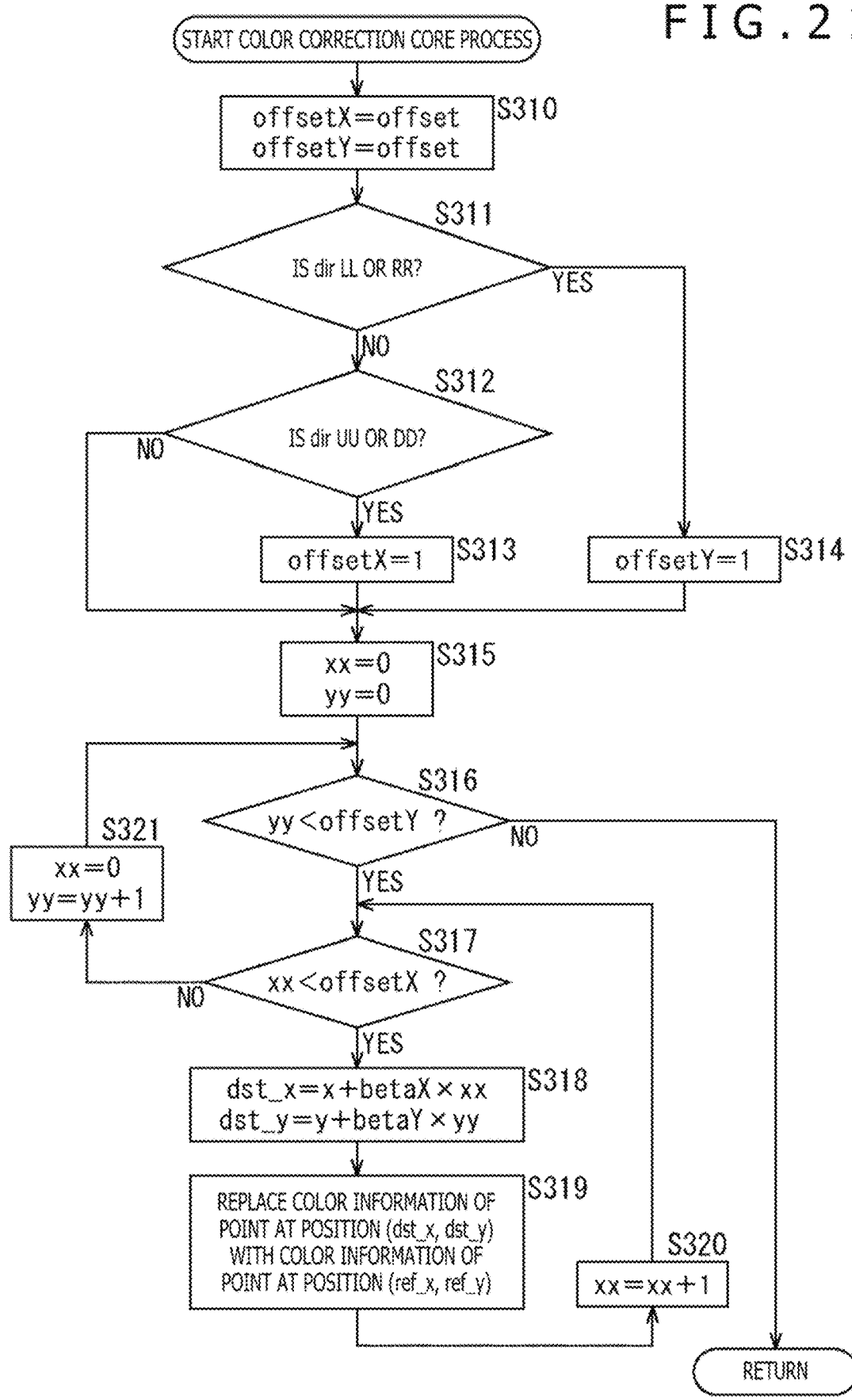
FIG. 21 is a flow chart describing a color correction core process in FIG. 18.

FIG. 21 is a flow chart describing the color correction core process in step S245 of FIG. 18.

In step S310 of FIG. 21, the color correction unit 13 sets offsetX and offsetY to "offset." In step S311, the color correction unit 13 determines whether the movement direction dir is LL or RR. If the color correction unit 13 determines that the movement direction dir is not LL or RR in step S311, the process proceeds to step S312.

In step S312, the color correction unit 13 determines whether the movement direction dir is UU or DD. If the color correction unit 13 determines that the movement direction dir is UU or DD in step S312, the color correction unit 13 changes offsetX to 1 in step S313 and advances the process to step S315.

On the other hand, if the color correction unit 13 determines that the movement direction dir is not UU or DD in step 2312, that is, if the movement direction dir is NONE, the process proceeds to step S315.

Furthermore, if the color correction unit 13 determines that the movement direction dir is LL or RR in step S311, the color correction unit 13 changes offsetY to 1 in step S314 and advances the process to step S315.

In step S315, the color correction unit 13 sets xx and yy to 0. In step S316, the color correction unit 13 determines whether yy is smaller than offsetY. If the color correction unit 13 determines that yy is smaller than offsetY in step S316, the color correction unit 13 determines whether xx is smaller than offsetX in step S317.

If the color correction unit 13 determines that xx is smaller than offsetX in step S317, the color correction unit 13 sets a sum of the x-coordinate of the target point and a product of betaX and xx to dst_x in step S318. The color correction unit 13 also sets a sum of the y-coordinate of the target point and a product of betaY and yy to dst_y.

In step S319, the color correction unit 13 replaces the color information of the point 91 at the position (dst_x, dst_y) with the color information of the point 91 at the position (ref_x, ref_y) in the three-dimensional data supplied from the movement vector calculation unit 12. In step S320, the color correction unit 13 increments xx by 1 and returns the process to step S317 to repeat the process in steps S317 to S320 until xx becomes equal to or greater than offsetX.

Furthermore, if the color correction unit 13 determines that xx is equal to or greater than offsetX in step S317, the color correction unit 13 sets xx to 0 and increments yy by 1. The process then returns to step S316, and the process in steps S316 to S321 is repeated until yy becomes equal to or greater than offsetY.

On the other hand, if the color correction unit 13 determines that yy is equal or greater than offsetY in step S316, the process ends. The process then returns to step S245 of FIG. 18 and proceeds to step S246.

In this way, the color correction unit 13 replaces the color information of the points 91 from the point 91 at the position (ref_x, ref_y) to the point 91 of the target point with the color information of the point 91 at the position (ref_x, ref_y).

Figure 22:
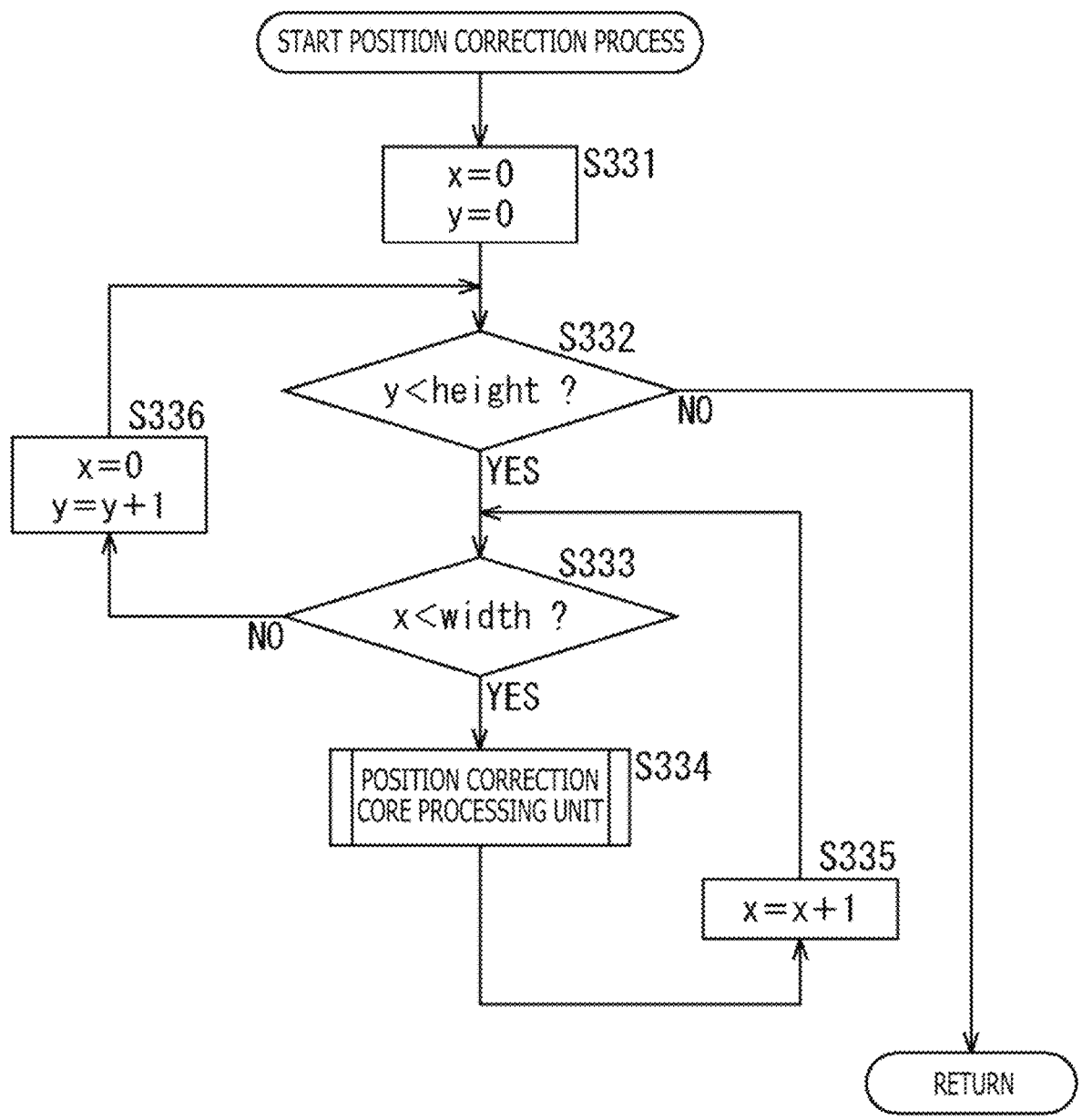
FIG. 22 is a diagram describing a flow chart of a position correction process in FIG. 5.

FIG. 22 is a diagram describing a flow chart of the position correction process in step S35 of FIG. 5.

The process in steps S331 to S333, S335, and S336 of FIG. 22 is similar to the process in steps S51 to S53, S57, and S58 of FIG. 6 except that the process is executed by the position correction unit 14 instead of the position calculation unit 31, and the description will be appropriately omitted.

If the position correction unit 14 determines that x is smaller than the number of pixels "width" in step S333, the process proceeds to step S334. In step S334, the position correction unit 14 executes a position correction core process of correcting the three-dimensional position of the target point. Details of the position correction core process will be described with reference to FIG. 23 described later. After the process of step S334, the process proceeds to step S335.

Furthermore, if the position correction unit 14 determines that y is equal to or greater than the number of pixels "height" in step S332, that is, if all pixels are the target points, the position correction unit 14 supplies the three-dimensional data of the points 91 including the corrected three-dimensional positions to the color image data generation unit 15. The process then returns to step S35 of FIG. 5, returns to step S11 of FIG. 4, and proceeds to step S12.

Figure 23:
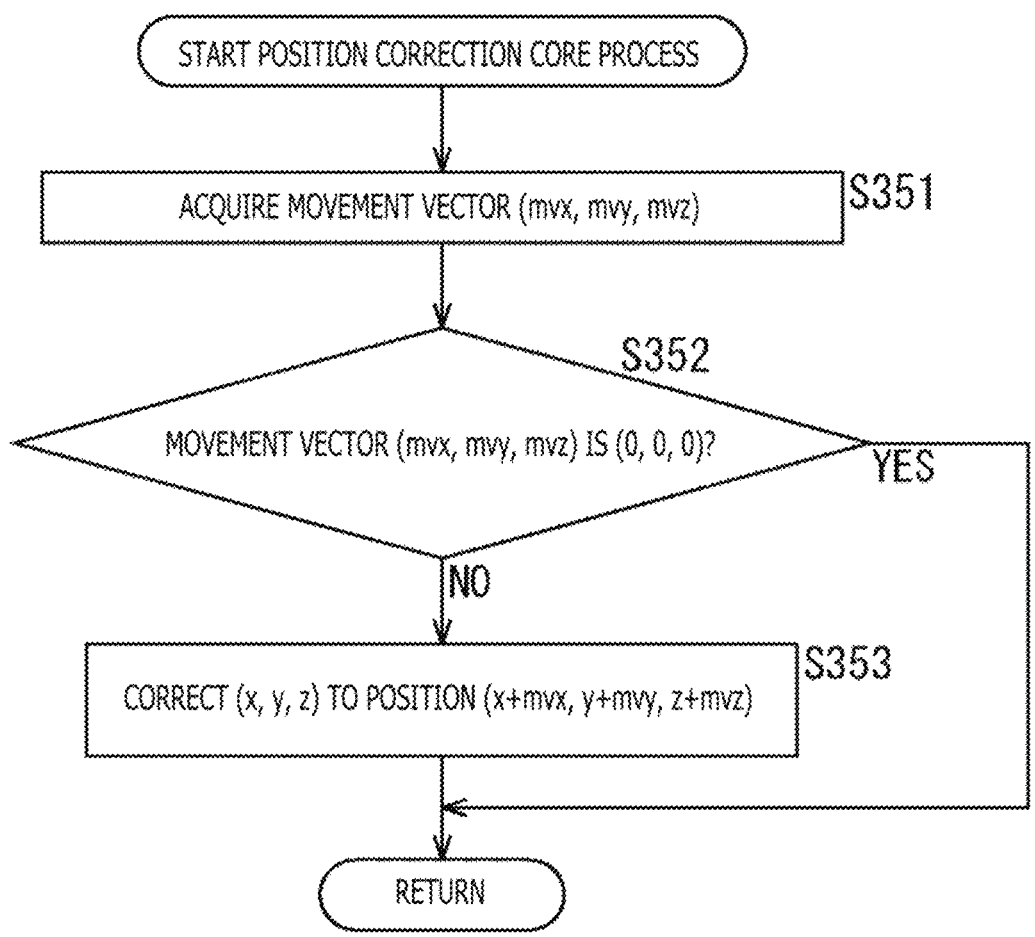
FIG. 23 is a flow chart describing details of a position correction core process in FIG. 22.

FIG. 23 is a flow chart describing the details of the position correction core process in step S334 of FIG. 22.

In step S351 of FIG. 23, the position correction unit 14 acquires the movement vector (mvx, mvy, mvz) from the color correction unit 13. In step S352, the position correction unit 14 determines whether the movement vector (mvx, mvy, mvz) is (0, 0, 0).

If the position correction unit 14 determines that the movement vector (mvx, mvy, mvz) is not (0, 0, 0) in step S352, the position correction unit 14 corrects the position (x, y, z) of the target point to a position (x+mvx, y+mvy, z+mvz) in step S353. The process then returns to step S334 of FIG. 22 and proceeds to step S335.

On the other hand, if the position correction unit 14 determines that the movement vector (mvx, mvy, mvz) is (0, 0, 0) in step S352, the position correction unit 14 does not correct the position (x, y, z) of the target point and returns the process to step S334 of FIG. 22 to advance the process to step S335.

(Description of Advantageous Effects)

Figure 24:
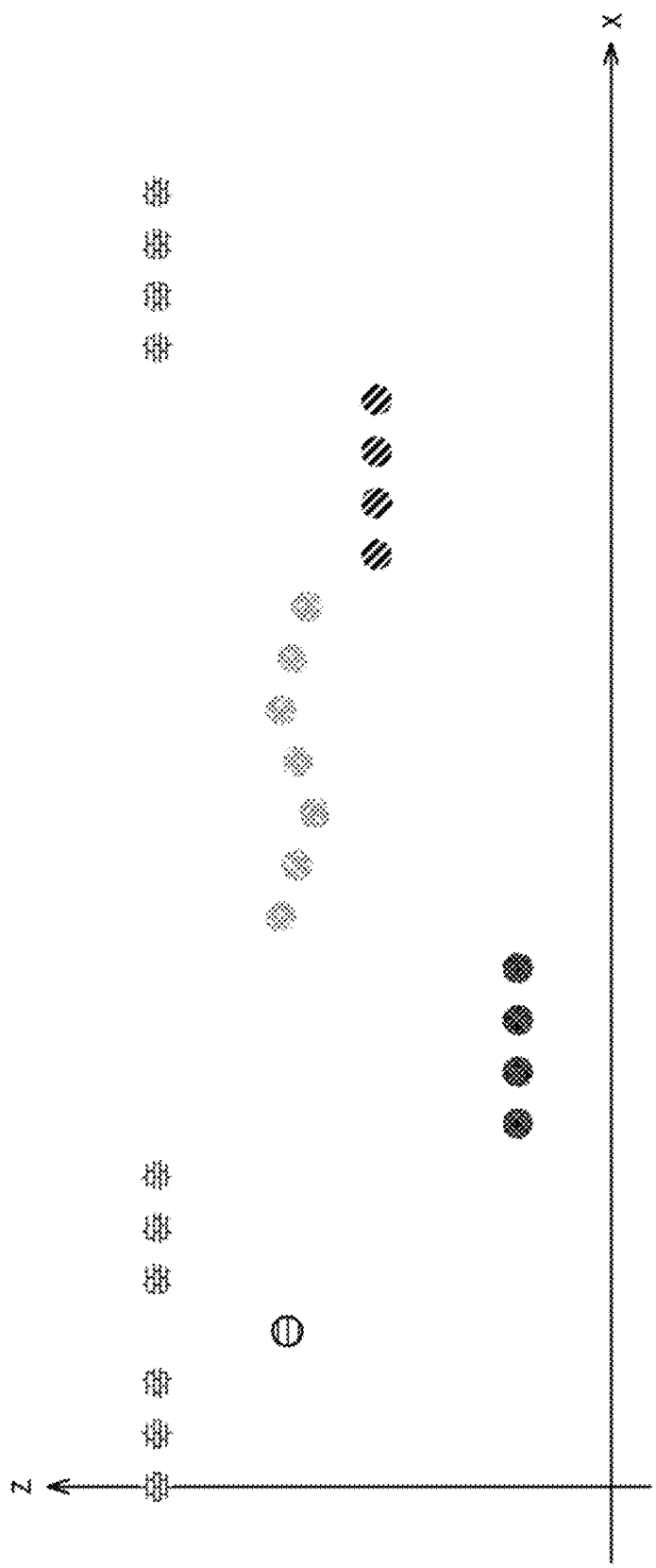
FIG. 24 is a graph illustrating x-coordinates and z-coordinates of points is which the y-coordinate is y1, among three-dimensional positions of respective points generated by a position calculation unit.

FIG. 24 is a graph illustrating x-coordinates and z-coordinates of the points 91 in which the y-coordinate is y1 in FIG. 2, among the three-dimensional positions of the respective points 91 generated by the position calculation unit 31.

In FIG. 24, the horizontal axis indicates the x-coordinates of the respective points 91, and the vertical axis indicates the z-coordinates. Furthermore, each point 91 is indicated by a circle in FIG. 24, and the pattern provided to the circle is the pattern provided to the background 70, the partial circle 71, the partial circle 72, the rectangle 73, or the cylinder 75 in FIG. 2 corresponding to the point 91. This is also similar in FIG. 25 and FIG. 26 described later.

Figure 25:
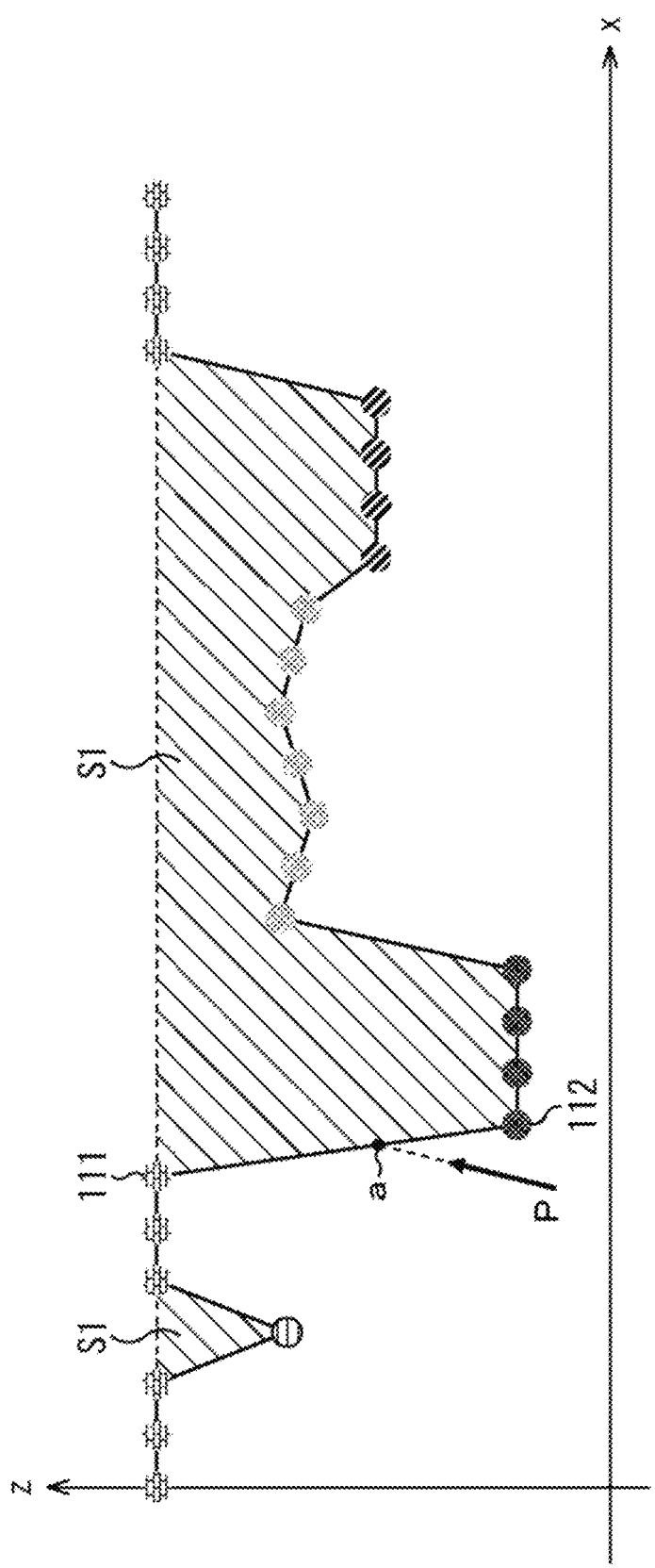
FIG. 25 is a graph illustrating connection information in the graph of FIG. 24.

FIG. 25 illustrates connection information of the points 91 generated by the patch generation unit 32 in the graph of FIG. 24.

In the graph of FIG. 25, the occlusion areas are indicated by areas S1, and the color information of the areas S1 does not exist in the three-dimensional data of the input image data. Therefore, in the case of generating color image data from the virtual viewpoint based on the three-dimensional data of the input image data, the color information of a predetermined position of the areas S1 projected to the pixel of the color image data from the virtual viewpoint is interpolated by, for example, using the color information of the point 91 as a vertex of the triangular patch 92 including the position.

For example, in a case where the direction of the virtual viewpoint is a direction of an arrow P as illustrated in FIG. 25, the color information of a position "a" of the area S1 projected to the color image data from the virtual viewpoint is interpolated on the basis of the color information of a point 111 of the background 70 and a point 112 of the cylinder 75.

In this case, the color image data from the virtual viewpoint can be generated. However, the color of the pixel of the color image data from the virtual viewpoint corresponding to the position "a" is a mixed color of the color of the background 70 and the color of the cylinder 75, and the user feels uncomfortable.

Figure 26:
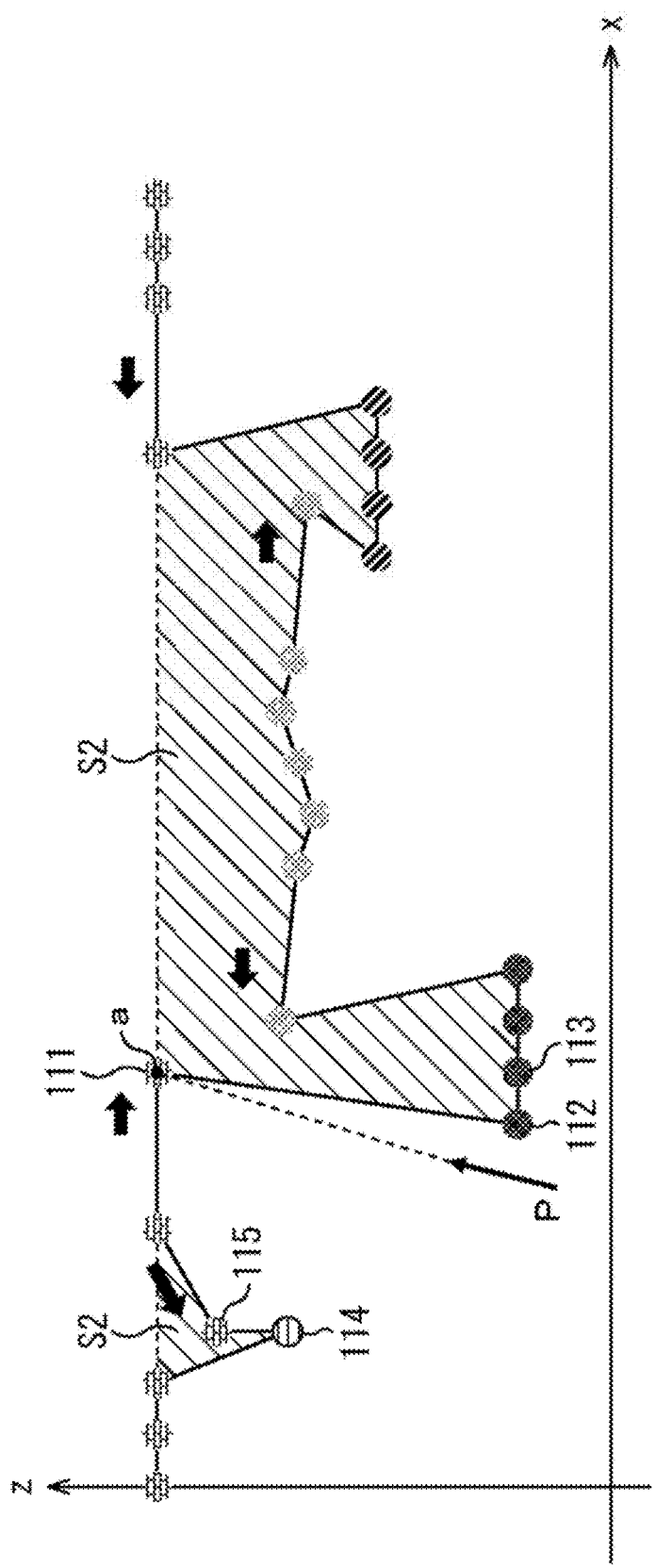
FIG. 26 is a graph illustrating x-coordinates and z-coordinates as well as connection information of the points in which the y-coordinate is y1, in color information and three-dimensional data with corrected three-dimensional positions.

FIG. 26 is a graph illustrating x-coordinates and z-coordinates as well as connection information of the points 91 in which the y-coordinate is y1 in FIG. 2, in the color information and the three-dimensional data with corrected three-dimensional positions supplied to the color image data generation unit 15.

As illustrated in FIG. 26, the x-coordinates of the points 91 on the far side among the points 91 of the boundaries of the occlusion areas are corrected to be the same as the x-coordinates of the points 91 on the near side close to the points 91 is the three-dimensional data supplied to the color image data generation unit 15.

For example, the x-coordinate of the point 111 on the far side among the points 91 of the boundaries of the occlusion areas is corrected to be the same as the x-coordinate of a point 113 that is a second pixel to the right of the point 111 and that is a point 91 on the near side of the point 111.

Therefore, the occlusion areas are indicated by areas S2 in the graph of FIG. 26, and the areas S2 are smaller than the areas S1. Therefore, the areas S2 in the color image data from the virtual viewpoint are projected to a smaller number of pixels. As a result, the uncomfortable feeling of the user can be reduced.

For example, in the case where the direction of the virtual viewpoint is the direction of the arrow P, the position "a" projected to the color image data from the virtual viewpoint is the position of the point 111 after the correction of the three-dimensional position outside of the area S2. Therefore, the color of the pixel of the color image data from the virtual viewpoint corresponding to the position "a" is not a mixed color of the color of the background 70 and the color of the cylinder 75 and is a color without uncomfortable feeling.

Furthermore, the maximum amount of movement is two or more in the example of FIG. 26, and the depth z of a point 115, which is corrected so that the x-coordinate becomes the same as a point 114 that is the first pixel to the left and that is a point 91 on a nearer side among the points 91 of the boundaries of the occlusion areas, is corrected to approach the depth z of the point 114.

Figure 27:
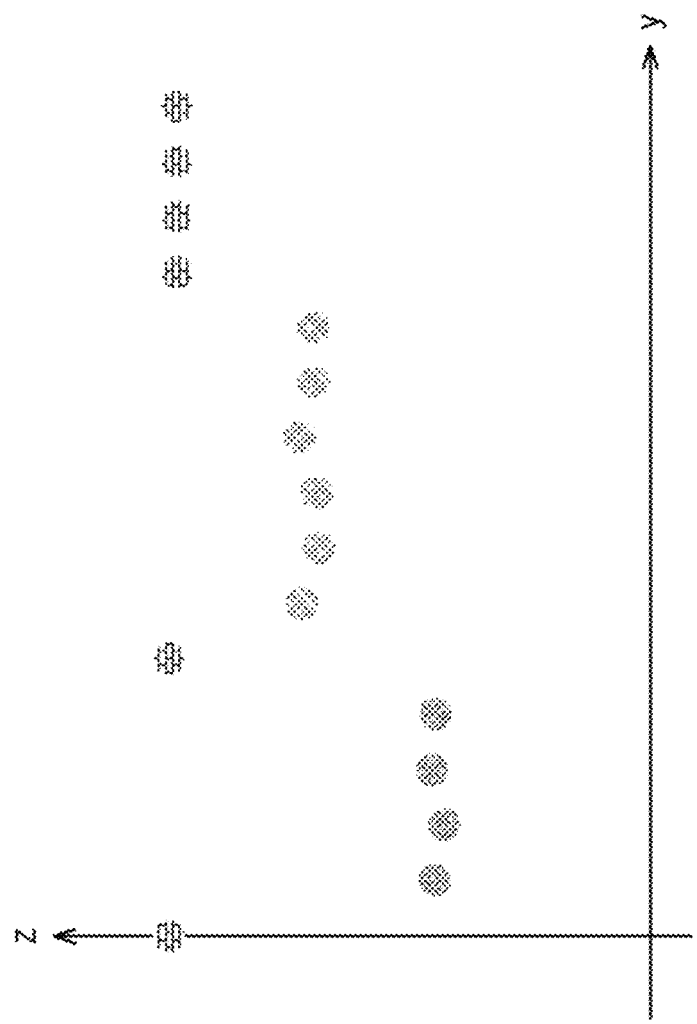
FIG. 27 is a graph illustrating y-coordinates and z-coordinates of points in which the x-coordinate is x1, among the three-dimensional positions of the respective points generated by the position calculation unit.

FIG. 27 is a graph illustrating the y-coordinates and the z-coordinates of the points 91 in which the x-coordinate is x1 in FIG. 2, among the three-dimensional positions of the respective points 91 generated by the position calculation unit 31.

In FIG. 27, the horizontal axis indicates the y-coordinates of the respective points 91, and the vertical axis indicates the z-coordinates. Furthermore, each point 91 is indicated by a circle in FIG. 27, and the pattern provided to the circle is the pattern provided to the background 70, the partial circle 72, or the cylinder 74 in FIG. 2 corresponding to the point 91. This is also similar in FIG. 28 and FIG. 29 described later.

Figure 28:
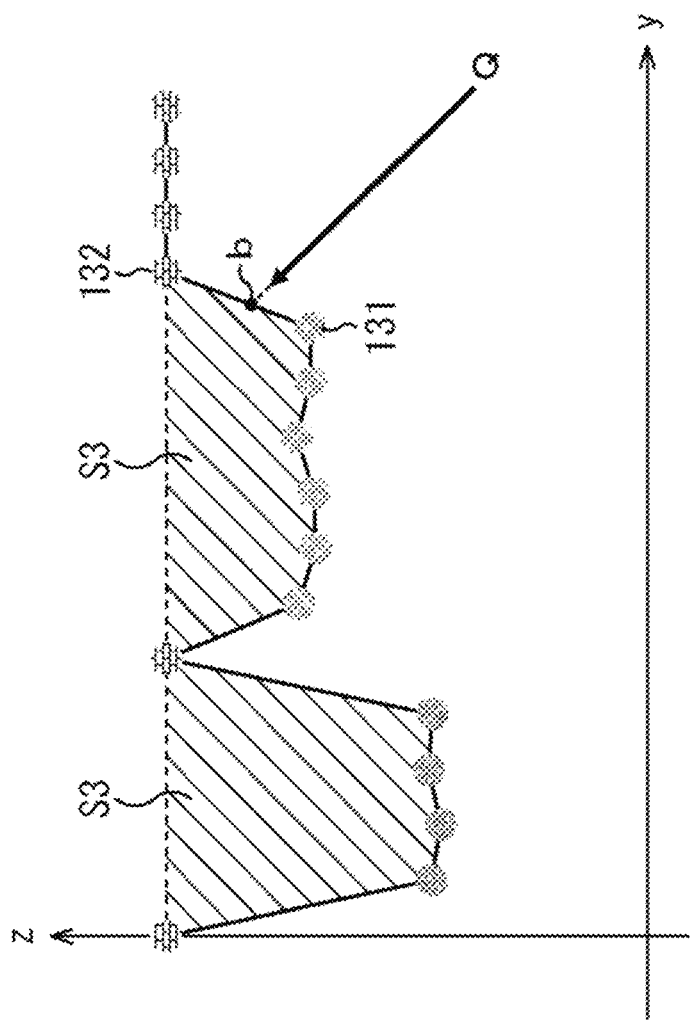
FIG. 28 is a graph illustrating connection information is the graph of FIG. 27.

FIG. 28 illustrates connection information of the points 91 generated by the patch generation unit 32 in the graph of FIG. 27.

In the graph of FIG. 28, the occlusion areas are indicated by areas S3, and the color information of the areas S3 does not exist in the three-dimensional data of the input image data. Therefore, in the case of generating color image data from the virtual viewpoint based on the three-dimensional data of the input image data, the color information of a predetermined position of the areas S3 projected to the pixel of the color image data from the virtual viewpoint is interpolated by, for example, using the color information of the point 91 as a vertex of the triangular patch 92 including the position.

For example, in a case where the direction of the virtual viewpoint is a direction of an arrow Q as illustrated in FIG. 28, the color information of a position "b" of the area S3 projected to the color image data from the virtual viewpoint is interpolated on the basis of the color information of a point 131 of the partial circle 72 and a point 132 of the background 70. As a result, the color of the pixel of the color image data from the virtual viewpoint corresponding to the position "b" is a mixed color of the color of the partial circle 72 and the color of the background 70, and the user feels uncomfortable.

Figure 29:
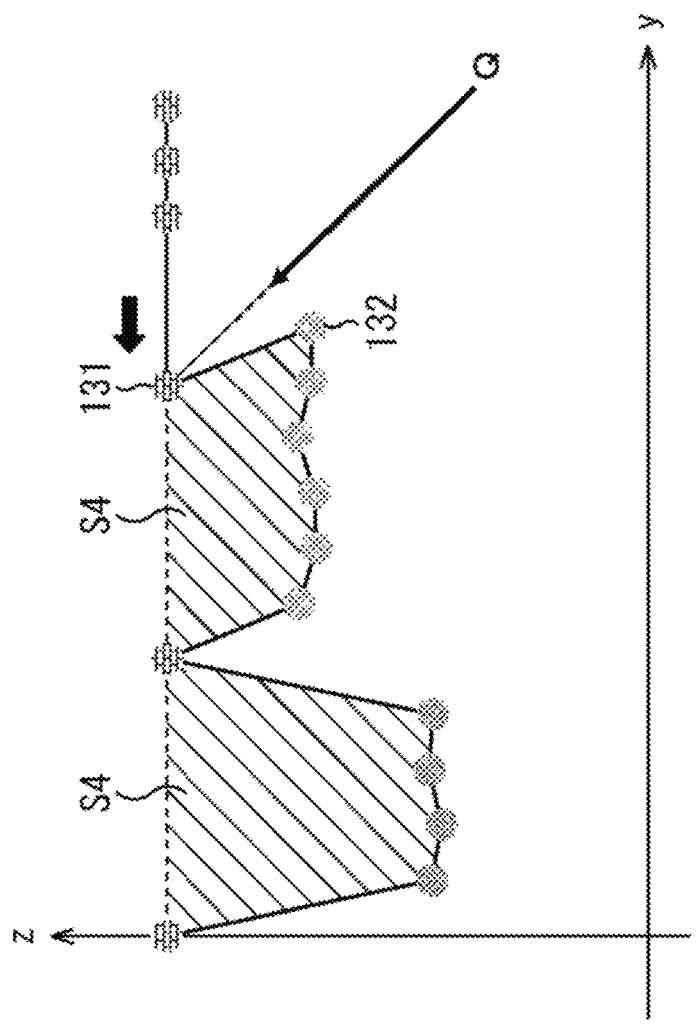
FIG. 29 is a graph illustrating y-coordinates and z-coordinates as well as connection information of the points in which the x-coordinate is x1, in color information and three-dimensional data with corrected three-dimensional positions.

FIG. 29 is a graph illustrating y-coordinates and z-coordinates as well as connection information of the points 91 in which the x-coordinate is x1 in FIG. 2, is the color information and the three-dimensional data with corrected three-dimensional positions supplied to the color image data generation unit 15.

As illustrated in FIG. 29, the y-coordinates of the points 91 on the far side among the points 91 of the boundaries of the occlusion areas are corrected to be the same as the y-coordinates of the points 91 on the near side close to the points 91 in the three-dimensional data supplied to the color image data generation unit 15.

For example, the y-coordinate of the point 131 on the far side among the points 91 of the boundaries of the occlusion areas is corrected to be the same as the y-coordinate of the point 113 that is a second pixel to the left of the point 131 and that is a point 91 on the near side of the point 131.

Therefore, the occlusion areas are indicated by areas 54 in the graph of FIG. 29, and the areas S4 are smaller than the areas S3. Therefore, the occlusion areas S4 in the color image data from the virtual viewpoint are projected to a smaller number of pixels. As a result, the uncomfortable feeling of the user can be reduced.

For example, in the case where the direction of the virtual viewpoint is the direction of the arrow Q, the position "b" projected to the color image data from the virtual viewpoint is the position of the point 131 after the correction of the three-dimensional position outside of the area S4. Therefore, the color of the pixel of the color image data from the virtual viewpoint corresponding to the position "b" is not a mixed color of the color of the background 70 and the color of the cylinder 75 and is a color without uncomfortable feeling.

Note that although the movement directions dir are four directions of UU, DD, LL, and RR in the description described above, the type of the movement direction dir is not limited to these.

(Another Example of Movement Direction)

Figure 30:
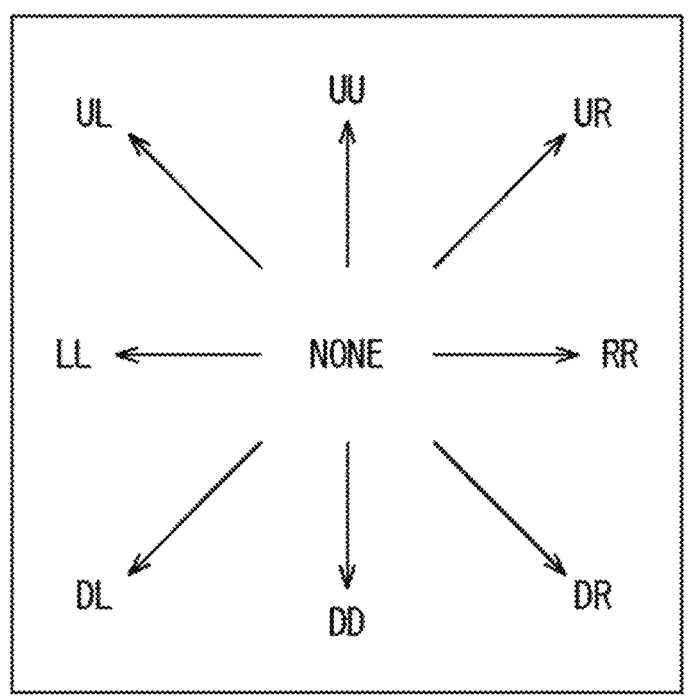
FIG. 30 depicts another example of the movement directions.
Figure 31:
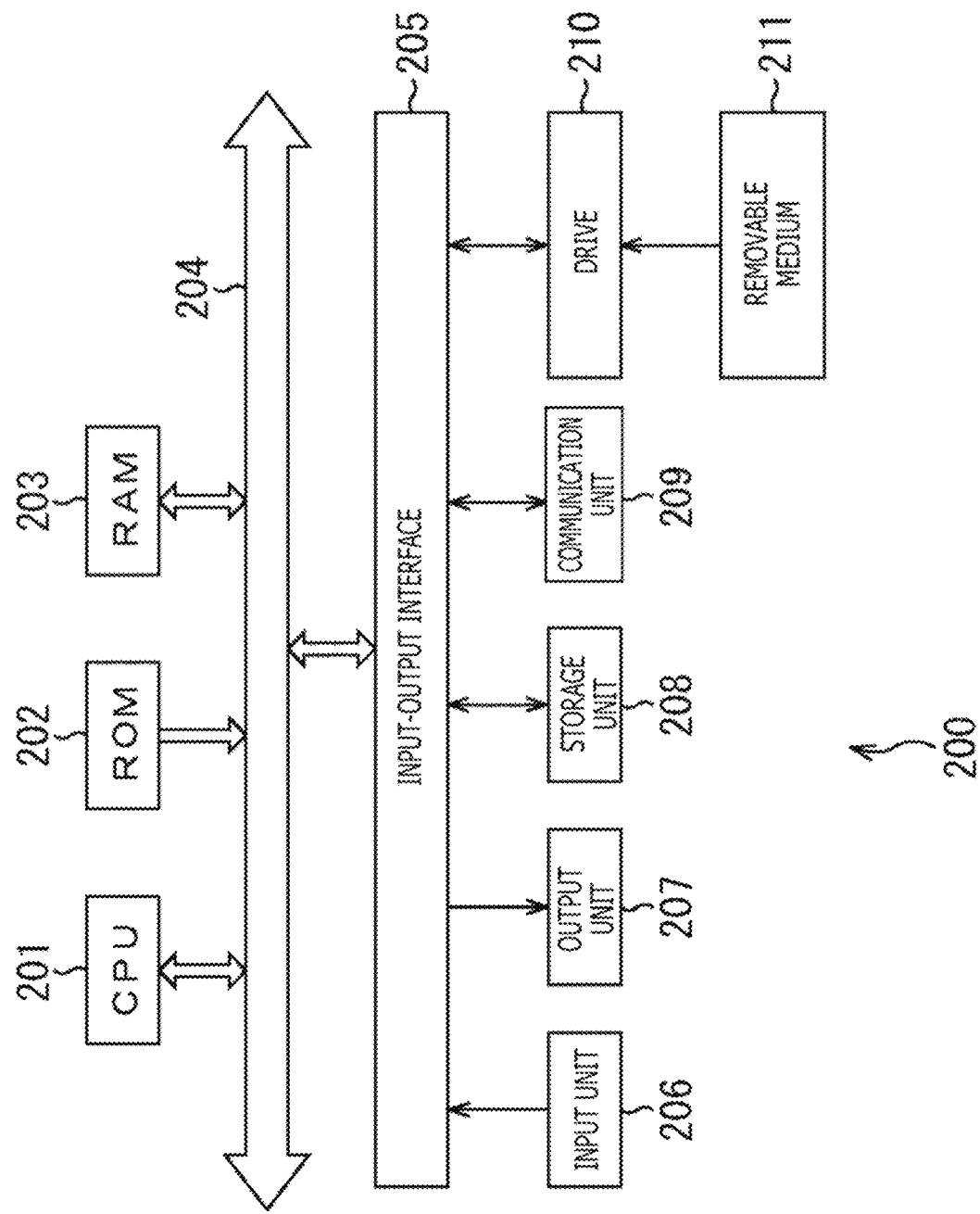
FIG. 31 is a block diagram illustrating a configuration example of hardware of a computer.

FIG. 30 depicts another example of the movement directions dir.

As illustrated in FIG. 30, the movement directions dir can be eight directions including four directions of UL indicating upper left, UR indicating upper right, DL indicating lower left, and DR indicating lower right in addition to the four directions of UU, DD, LL, and RR.

In this case, the number of conditional expressions in the movement direction decision core process of FIG. 11 is eight, and each conditional expression is different from the conditional expressions described in FIG. 11.

As described above, the image processing apparatus 10 corrects the three-dimensional positions of the points of the boundaries of the occlusion areas included in the three-dimensional data of the input image data, and the occlusion areas can be reduced. Therefore, color image data from the virtual viewpoint can be generated with little uncomfortable feeling, without generating color information of the occlusion areas for each virtual viewpoint. As a result, the fast movement of the virtual viewpoint can be followed to generate color image data from the virtual viewpoint with high precision. Furthermore, the load of the process of generating the color image data from the virtual viewpoint can be reduced.

Second Embodiment (Description of Computer According to Present Disclosure)

The above-described series of processes can also be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

FIG. 31 is a block diagram illustrating a configuration example of hardware of a computer that uses a program to execute the above-described series of processes.

In a computer 200, a CPU (Central Processing Unit) 201, a ROM (Read Only Memory) 202, and a RAM (Random Access Memory) 203 are connected to each other by a bus 204.

An input-output interface 205 is further connected to the bus 204. An input unit 206, an output unit 207, a storage unit 208, a communication unit 209, and a drive 210 are connected to the input-output interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface and the like. The drive 210 drives a removable medium 211, such as a magnetic disk, an optical disk, a magneto-optical disk, and a semiconductor memory.

In the computer 200 configured in this way, the CPU 201 loads, on the RAM 203, a program stored in the storage unit 208 through the input-output interface 205 and the bus 204 and executes the program to execute the series of processes, for example.

The program executed by the computer 200 (CPU 201) can be provided by, for example, recording the program in the removable medium 211 as a package medium or the like. The program can also be provided through a wired or wireless transmission medium, such as a local area network, the Internet, and digital satellite broadcasting.

In the computer 200, the removable medium 211 can be mounted on the drive 210 to install the program on the storage unit 208 through the input-output interface 205. The program can also be received by the communication unit 209 through a wired or wireless transmission medium and installed on the storage unit 208. Furthermore, the program can be installed in advance in the ROM 202 or the storage unit 208.

Note that the program executed by the computer 200 may be a program for executing the processes in chronological order described in the present specification or may be a program for executing the processes in parallel or at a necessary timing such as when the program is invoked.

The advantageous effects described in the present specification are exemplary only and not limiting, and there can be other advantageous effects.

Furthermore, the embodiments of the present disclosure are not limited to the embodiments described above, and various changes can be made without departing from the scope of the present disclosure.

For example, the present disclosure can be configured as cloud computing in which a plurality of apparatuses take charge and cooperate to process one function through a network.

In addition, one apparatus can execute each step described in the flow charts, or a plurality of apparatuses can take charge and execute each step.

Furthermore, in the case where one step includes a plurality of processes, one apparatus can execute the plurality of processes included in one step, or a plurality of apparatuses can take charge and execute the processes.

Note that the present disclosure can also be configured as follows.

(1)
An image processing apparatus including:
a position correction unit that corrects a three-dimensional position of a point of a boundary of an occlusion area among a plurality of points, the three-dimensional position being included in three-dimensional data including three-dimensional positions and color information of the plurality of points, the three-dimensional data being generated from color image data and depth image data from a predetermined viewpoint.

(2)
The image processing apparatus according to (1), in which
the position correction unit is configured to correct a two-dimensional position of the point of the boundary of the occlusion area to a two-dimensional position of a reference point that is a point close to and on a near side of the point of the boundary of the occlusion area.

(3)
The image processing apparatus according to (2), in which
the position correction unit is configured to correct the position of the point of the boundary of the occlusion area in a depth direction.

(4)
The image processing apparatus according to (3), in which
the position correction unit corrects the position of the point of the boundary of the occlusion area in the depth direction in a case where an amount of correction of the two-dimensional position of the point of the boundary of the occlusion area is smaller than a threshold.

(5)
The image processing apparatus according to (4), in which
the position correction unit uses the position of the reference point in the depth direction to correct the position of the point of the boundary of the occlusion area in the depth direction.

(6)
The image processing apparatus according to any one of (1) to (5), further including:
a color image data generation unit that generates color image data from a viewpoint different from the predetermined viewpoint on the basis of the three-dimensional data including the three-dimensional position of the point of the boundary of the occlusion area corrected by the position correction unit.

(7)
The image processing apparatus according to any one of (1) to (6), further including:
a color correction unit that corrects the color information.

(8)
The image processing apparatus according to (7), in which
the color correction unit is configured to correct the color information of points that are continuous with the point of the boundary of the occlusion area and that are within a predetermined range from the position of the point in the depth direction, to the color information of a point among the points farthest from the point of the boundary of the occlusion area.

(9)
The image processing apparatus according to any one of (1) to (8), further including:
a three-dimensional data generation unit that generates the three-dimensional data on the basis of the color image data and the depth image data from the predetermined viewpoint.

(10)
An image processing method including:
a position correction step of correcting, by an image processing apparatus, a three-dimensional position of a point of a boundary of an occlusion area among a plurality of points, the three-dimensional position being included in three-dimensional data including three-dimensional positions and color information of the plurality of points, the three-dimensional data being generated from color image data and depth image data from a predetermined viewpoint.

REFERENCE SIGNS LIST

10 Image processing apparatus, 14 Position correction unit, 51 Color image data, 52 Depth image data, 91, 111, 113, 114, 115 Points

The invention claimed is:

1. An image processing apparatus comprising:
   circuitry configured to:
   generate three-dimensional data from color image data and depth image data from a predetermined viewpoint, the three-dimensional data including a plurality of three-dimensional positions and color information of a plurality of points;
   correct a three-dimensional position of a point of a boundary of an occlusion area among the plurality of points to a corrected three-dimensional position different than the three-dimensional position; and
   generate different color image data from a viewpoint different from the predetermined viewpoint based on the three-dimensional data including the corrected three-dimensional position of the point of the boundary of the occlusion area.

2. The image processing apparatus according to claim 1, wherein the circuitry is further configured to:
   correct a two-dimensional position of the point of the boundary of the occlusion area to a two-dimensional position of a reference point that is a point close to and on a near side of the point of the boundary of the occlusion area.

3. The image processing apparatus according to claim 2, wherein the circuitry is further configured to:
   correct the position of the point of the boundary of the occlusion area in a depth direction.

4. The image processing apparatus according to claim 3, wherein the circuitry is further configured to:
   correct the position of the point of the boundary of the occlusion area in the depth direction in a case where an amount of correction of the two-dimensional position of the point of the boundary of the occlusion area is smaller than a threshold.

5. The image processing apparatus according to claim 4, wherein the circuitry is further configured to:
   use the position of the reference point in the depth direction to correct the position of the point of the boundary of the occlusion area in the depth direction.

6. The image processing apparatus according to claim 1, wherein the circuitry is further configured to:
   correct the color information.

7. The image processing apparatus according to claim 6, wherein the circuitry is configured to:
   correct the color information of points of the plurality of points that are continuous with the point of the boundary of the occlusion area and that are within a predetermined range from the position of the point in a depth direction, to the color information of a point among points of the plurality of points farthest from the point of the boundary of the occlusion area.

8. The image processing apparatus according to claim 1, wherein the circuitry is further configured to:
   generate the three-dimensional data on the basis of the color image data and the depth image data from the predetermined viewpoint.

9. An image processing method comprising:
   generating, by an image processing apparatus, three-dimensional data from color image data and depth image data from a predetermined viewpoint, the three-dimensional data including a plurality of three-dimensional positions and color information of a plurality of points;
   correcting, by the image processing apparatus, a three-dimensional position of a point of a boundary of an occlusion area among the plurality of points to a corrected three-dimensional position different than the three-dimensional position; and
   generating, by the image processing apparatus, different color image data from a viewpoint different from the predetermined viewpoint based on of the three-dimensional data including the corrected three-dimensional position of the point of the boundary of the occlusion area.

10. A non-transitory computer-readable medium having embodied thereon a program, which when executed by a computer causes the computer to execute an image processing method, the method comprising:
    generating, by an image processing apparatus, three-dimensional data from color image data and depth image data from a predetermined viewpoint, the three-dimensional data including a plurality of three-dimensional positions and color information of a plurality of points;
    correcting, by the image processing apparatus, a three-dimensional position of a point of a boundary of an occlusion area among the plurality of points to a corrected three-dimensional position different than the three-dimensional position; and
    generating, by the image processing apparatus, different color image data from a viewpoint different from the predetermined viewpoint based on the three-dimensional data including the corrected three-dimensional position of the point of the boundary of the occlusion area.

* * * * *